(12) United States Patent
Sprenger et al.

(10) Patent No.: US 9,305,205 B2
(45) Date of Patent: Apr. 5, 2016

(54) METHODS AND SYSTEMS FOR TRACKING MOVEMENT OF MICROSCOPIC WORMS AND WORM-LIKE ORGANISMS, AND SOFTWARE THEREFOR

(71) Applicant: Microbrightfield, Inc., Williston, VT (US)

(72) Inventors: Jeffrey H. Sprenger, Essex Junction, VT (US); Jacob R. Glaser, Williston, VT (US); Nicolas Roussel, Williston, VT (US)

(73) Assignee: Microbrightfield, Inc., Williston, VT (US)

( * ) Notice: Subject to any disclaimer, the term of this patent is extended or adjusted under 35 U.S.C. 154(b) by 131 days.

(21) Appl. No.: 14/176,436

(22) Filed: Feb. 10, 2014

(65) Prior Publication Data

US 2014/0286529 A1 Sep. 25, 2014

Related U.S. Application Data

(60) Provisional application No. 61/764,694, filed on Feb. 14, 2013.

(51) Int. Cl.
*G06K 9/00* (2006.01)
(52) U.S. Cl.
CPC .................................. *G06K 9/00127* (2013.01)
(58) Field of Classification Search
None
See application file for complete search history.

(56) References Cited

PUBLICATIONS

The Worm Project—FarsightWiki, 2011.*
Roussel, Nicolas, et al. "A functional model for C. elegans locomotory behavior analysis and its application to tracking." (2007).*
Roussel, Nicolas, et al. "A computational model for C. elegans locomotory behavior: application to multiworm tracking." Biomedical Engineering, IEEE Transactions on 54.10 (2007): 1786-1797.*
Fontaine, Ebraheem, Joel Burdick, and Alan Barr. "Automated tracking of multiple C. elegans." Engineering in Medicine and Biology Society, 2006. EMBS'06. 28th Annual International Conference of the IEEE. IEEE, 2006.*
Tsechpenakis, Gabriel, et al. "A novel computational approach for simultaneous tracking and feature extraction of C. elegans populations in fluid environments." Biomedical Engineering, IEEE Transactions on 55.5 (2008): 1539-1549.*
Geng, Wei, et al. "Automatic tracking, feature extraction and classification of C. elegans phenotypes." Biomedical Engineering, IEEE Transactions on 51.10 (2004): 1811-1820.*

(Continued)

*Primary Examiner* — Li Liu
(74) *Attorney, Agent, or Firm* — Downs Rachlin Martin PLLC

(57) ABSTRACT

Methods and systems for tracking one or more worms or worm-like organisms over a sequence of video frames in virtual real time. The methods and systems can include a robust organism model that accounts for shape changes that occur from one frame to another, such as peristaltic progression, longitudinal deformation, lateral deformation, and bending action. Other features disclosed include: features that allow a user to correct tracking errors, such as splitting a single organism track into two tracks, joining two organism tracks into a single track, switching locations of physical features (such as heads and tails of worms), deleting undesired tracked organisms, and manually tracing organism outlines for model fitting; features that allow a user to set tracking parameters by selecting one or more organisms having desired characteristics; features for automatedly resolving interactions between/among multiple organisms; and features for handling multiple tracking hypotheses, among others.

23 Claims, 9 Drawing Sheets

(56) References Cited

PUBLICATIONS

Huang, Kuang-Man, Pamela Cosman, and William R. Schafer. "Automated tracking of multiple C. elegans with articulated models." Biomedical Imaging: From Nano to Macro, 2007. ISBI 2007. 4th IEEE International Symposium on. IEEE, 2007.*

Roussel, Nicolas, A Computational Model for C. Elegans Locomotory Behavior: Application To Multi-Worm Tracking; Thesis Submitted to the Graduate Faculty of Rensselaer Polytechnic Institute; Nov. 2007; pp. 1-105.

* cited by examiner

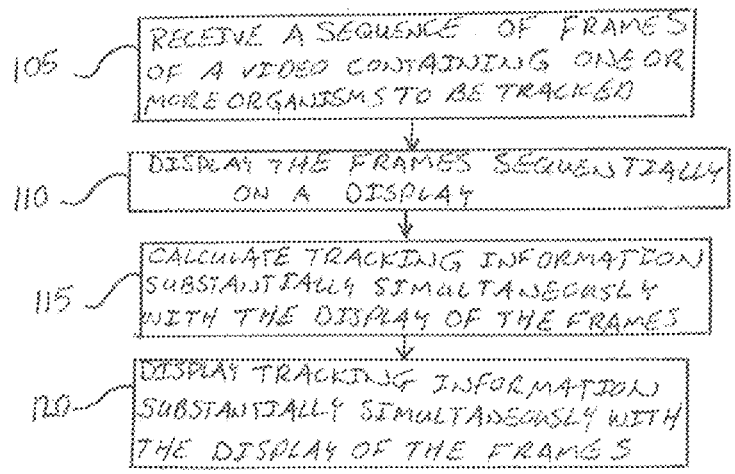
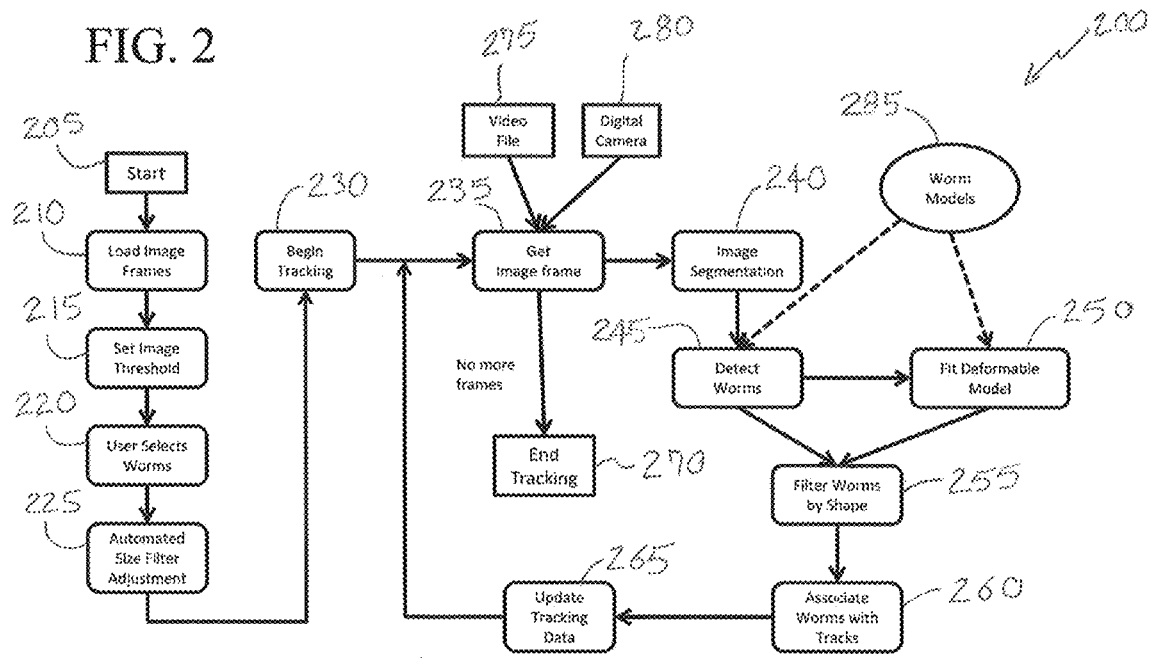

METHODS AND SYSTEMS FOR TRACKING MOVEMENT OF MICROSCOPIC WORMS AND WORM-LIKE ORGANISMS, AND SOFTWARE THEREFOR

RELATED APPLICATION DATA

This application claims the benefit of priority of U.S. Provisional Patent Application Ser. No. 61/764,694, filed on Feb. 14, 2013, and titled "Software System For Tracking Microscopic Worms Using A Deformation Model," which is incorporated by reference herein in its entirety.

FIELD OF THE INVENTION

The present invention generally relates to the field of automated tracking of organisms. In particular, the present invention is directed to methods and systems for tracking movement of microscopic worms and worm-like organisms, and software therefor.

BACKGROUND

Visual tracking of organisms can be useful in a variety of contexts. For example, *Caenorhabditis elegans*, or simply "*C. elegans*," which are a type of nematode (roundworm), are often used as model organisms for biological research, such as investigation of neural development. Some aspects of research, including post transcriptional gene silencing and substance testing, among others, conducted using *C. elegans*, involve tracking the movements of the *C. elegans* to determine the effects of the gene silencing or tested substance(s) on the movements of the *C. elegans*. A few automated tracking software programs have been developed for tracking *C. elegans*, but they are not able to provide, among other things, real-time tracking and differentiation between or among *C. elegans* that are entangled or otherwise in contact with one another.

SUMMARY OF THE DISCLOSURE

In an implementation, the present disclosure is directed to a method of tracking one or more worms, the method being implemented by a computer-based worm-tracking system and including receiving, sequentially, a plurality of frames of a video containing one or more worms; displaying, sequentially on an electronic display, the plurality of frames of the video; calculating, substantially simultaneously with the displaying of the plurality of frames and sequentially from the plurality of frames, tracking information for one or more of the worms so as to create one or more tracked worms; and displaying, substantially simultaneously with the displaying of the plurality of frames on the electronic display, the tracking information overlaid onto the corresponding respective ones of the plurality of frames of the video.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 1 is a flow diagram illustrating a method of automatically tracking one or more organisms in real time;

FIG. 2 is a diagrammatic representation of a worm-tracking system that utilizes the method of FIG. 1;

DETAILED DESCRIPTION

Figure 3:
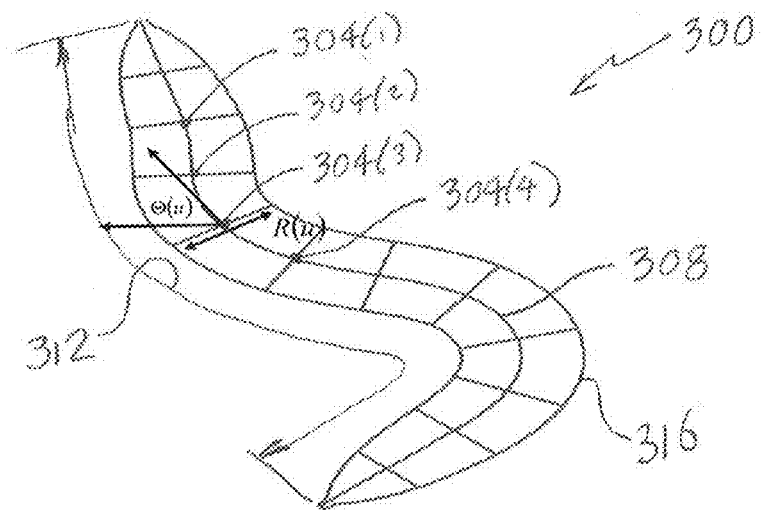
FIG. 3 is a diagram illustrating a geometric worm model that can be used in a tracking system made in accordance with the present invention, such as the worm tracking system of FIG. 2.

Aspects of the present invention include a system that combines software and hardware to track the positions and shapes of moving microscopic and macroscopic organisms, such as microscopic nematodes (worms) (e.g., *C. elegans*) and other worm-like organisms while crawling, swimming or thrashing, or while motionless, such as in a petri dish or multi-well plate. It is noted here at the outset that while the term "worm" is primarily used in the descriptions below, those skilled in the art will understand that aspects of the present invention are applicable not only to worms but also to other organisms that exhibit worm-like behavior. By "worm-like," it is meant that the organism at issue structurally resembles a worm (e.g., have an elongated body) and exhibits one or more movements that are the same as or similar to one or more corresponding movements commonly associated with worms, including, but not limited to, swimming, thrashing, elongation (perhaps accompanied by body narrowing), longitudinal contraction (perhaps accompanied by body widening), and longitudinally undulating motion, among others.

In some embodiments, a system made in accordance with the present invention can record position and shape information of multiple worms over time and provides analysis methods for determining worm speed, distance traveled, worm size, direction of travel, orientation reversal, or shape conformation, and any combination thereof. Such a system can also be configured to provide a graphical display of tracked worms and to store tracking data to a computer-readable hardware storage medium, such as a non-volatile semiconductor memory, optical memory, etc., for later review and analysis. In some embodiments, software made in accordance with the present invention can accept input from pre-recorded video file or from a direct camera video stream feed, according to the desire/need of the user. Unique features that a system of the present invention can have include the ability to track multiple worms through their interactions and partial occlusions, to adapt a worm model to changes in shape and length while the worms move, to model the worm through different bending configurations that include self-overlap and overlap with other worms, to interpret the shape of the worm based on its bending angle along the worm centerline, and to provide a user with simple tools that allow a user to easily control the software to provide user-desired results quickly and efficiently. These and other features are described below in detail.

In some embodiments, the methods and software are designed for optimal tracking of worms across successive frames in a video sequence. The software can calculate worm shape and location from one frame to the next across multiple successively acquired images. In addition, the software can maintain the successive position of each worm within the field of view in a track data structure. Each time the system acquires a new frame, the software can review the active worm tracks and attempt to detect a worm for each track in the current frame. A system of the present invention can utilize techniques, such as shape registration and multiple hypotheses data association, to maximize the likelihood of detection. In some embodiments, if detection is successful, the software extends the track, and if unsuccessful, the software interrupts the track and marks the track as inactive.

In some embodiments, at regular time intervals (e.g., every N frames, wherein N is an integer of 1 or more), the software performs an image-wide detection sweep to detect any new worm entering the field of view, and in some cases, as well as to detect prematurely lost objects. If the software may start a new worm track after the beginning of the sequence, it assumes that the worm creating the track was present all along. To test and resolve this issue, the software can be configured to track the new object backward in time. During the backtracking process, the software can attempt to reconnect the current track to a previously interrupted worm track.

Conventional state-of-the-art worm-tracking software of which the present inventors are aware lacks workflow features and are, therefore, fairly cumbersome to use. In addition, and as noted in the Background section, such software is not able to track a worm, let alone multiple worms simultaneously, in real time. In contrast, some embodiments of the software of the present invention can track single and multiple worms in real time. The present inventors believe that real-time tracking is made possible by, at least in part, the unique worm-tracking models utilized that allow the software to quickly adjust model parameters to fit the models to the worm(s) as they appear in successive frames of a live or prerecorded video. Those skilled in the art will understand the computational efficiencies attendant resulting from the worm shape and motion models described herein and other shape and motion models that fall within the spirit of the disclosed models.

Specific aspects and features of exemplary systems of the present invention are described below. It is noted that while the following descriptions are directed to the tracking of microscopic worms, systems made in accordance with these various aspects and features can be implemented for tracking other organisms, either micro or macro, as well. Generally, a primary difference between such other systems and the system described is in the modeling of the subject matter being tracked. In the following example, the organisms being tracked are worms, and the models used include sophisticated shape and movement models for the anticipated worm shapes and typical movements of the worms based on known worm behavior. As those skilled in the art will readily appreciate, analogous shape and movement models can be developed for other singled cell or multicell organisms or biological structures, such as nematodes, zebrafish, drosophila (adult and larvae), neurons, neuroblasts, blood cells, stem cells, paramecia, and hydra.

As mentioned above, a powerful feature of some embodiments of the present invention is the ability to generate and display one or more worm tracks in real time as the corresponding frames of a video containing the worm(s) are being displayed at a normal frame-rate, such as 30 frames per second (FPS). As used herein and in the appended claims, the term "normal frame-rate" means the usual, or default, frame rate of the video at issue that typically allows the viewer to visually perceive any continuous motion of an object in the video as the continuous motion that it is. Those skilled in the art will readily appreciate that while 30 FPS is currently a common frame rate, it is not exclusive, since aspects and features of the present invention can be implemented at other frame rates, for example, frame rates from 4 FPS to 60 FPS or more, such as 5 FPS, 8 FPS, 15 FPS, 20 FPS, and 60 FPS, among others. Referring now to the drawings, FIG. 1 illustrates a method 100 of automatically tracking one or more organisms within a video in real time.

At step 105, a sequence of frame of the video containing the one or more organisms, for example, worms, that a user desires to track are received sequentially. The video can be either a live-feed video or a prerecorded video, depending on the particular application. If a prerecorded video is used, the video can be in any suitable electronic file format compatible with a video player implemented for playback. The number of frames can range from a subset of the frames in the video to all of the frames, depending on user choices and/or system settings.

At step 110, the plurality of frames received at step 105 are displayed sequentially on an electronic display in the same order received so as to be viewable by one or more viewers, such as a user of software designed to implement method 100. Typically, the display of the plurality of frames at step 110 is performed at a normal frame rate, such as 30 fps, so that continuous motion of objects in the video appear as continuous motion to the viewer(s). In some embodiments, a user may choose to slow the display of the video to a slower-than-normal frame rate for any one or more of a variety of reasons, such as to view fine movements and review events within the video more closely. In some embodiments, a user may choose to speed up the frame rate for fast review of a prerecorded video.

At step 115, tracking information is calculated substantially simultaneously with the display of the sequence of frames. Tracking information can include, but is not necessarily limited to: boundaries of each organism or portion thereof with respect to the current frame; the location(s) within the corresponding frame of one or more features of each organism, such as a head, tail, center point, longitudinal centerline; location(s) of one or more modeling points; direction of travel; speed of travel; association with previously established track; wavelength; bending angle along the worm centerline; fit of the image data to the underlying model; and reversal of movement. As will be discussed in more detail below, much of this information flows from the fitting of one or more models to each of one or more object(s) (e.g., organism(s)) automatically identified within each frame analyzed. In one example presented below in the context of worm (*C. elegans*) tracking, the models used are a geometric model that describes a worm's shape and a motion model that describes a worm's motion. In the particular embodiments described, the geometric model accounts for elasticity in worm shape during peristaltic progression, and the motion model accounts for radial displacement of the center of a worm that results in local changes in the curvature of the worm at its midsection.

Tracking information is calculated at step 115 at each of a series of frames within the plurality of frames. For example, tracking information can be calculated at regular intervals of every N frames, wherein N is an integer equal to or greater than one. Of course, at N=1, tracking information is calculated for every frame. For some applications, it may not be necessary or desirable to calculate tracking information that frequently. In such cases, less frequent tracking, say once every second frame (N=2) or once every fifth frame (N=5) or once every tenth frame (N=10), etc., may be sufficient. This can particularly be true at frame rates higher than needed for persistence of vision to provide the illusion of continuous motion. The calculation of tracking information can require a number of steps for each calculation frame, including image segmentation, organism detection, model fitting, shape filtering, and track association, among others. Each of these and other steps is described below in detail in the context of worm (*C. elegans*) tracking, though skilled artisans will readily understand how to implement the same or similar steps for worms other than *C. elegans*, as well as different organisms, without undue experimentation.

Figure 7:
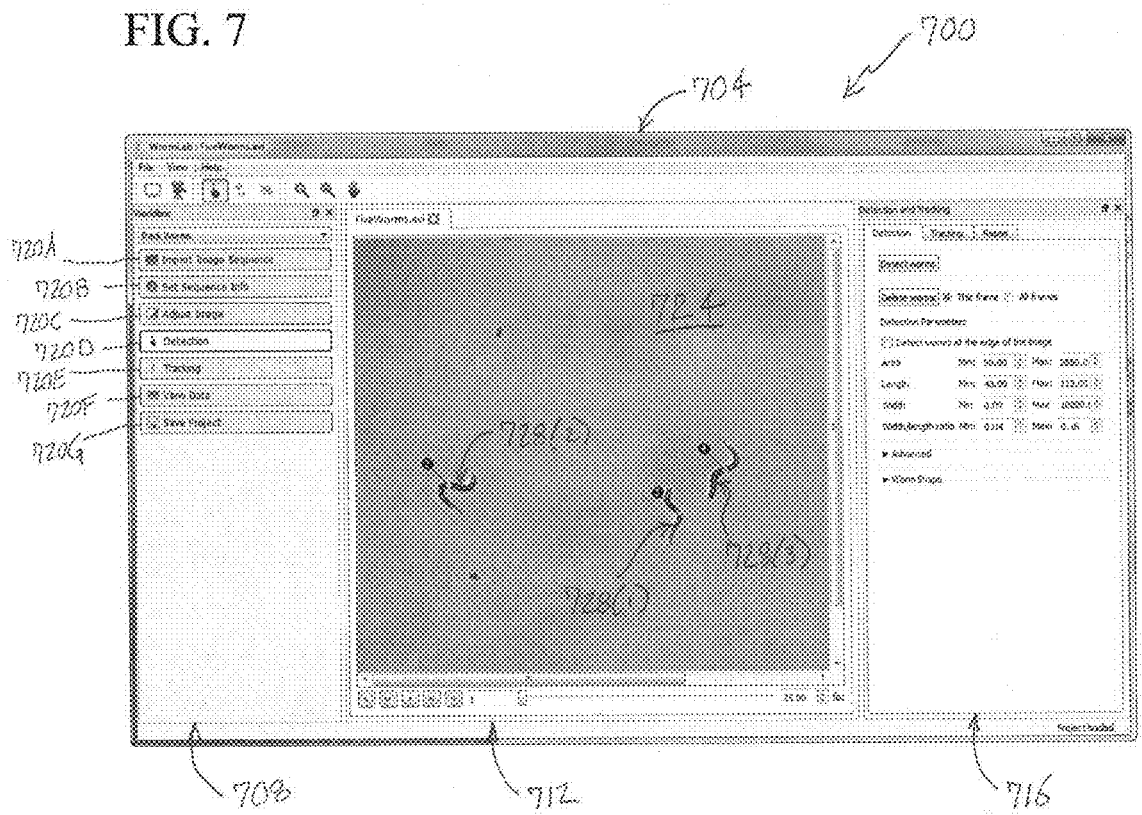
FIG. 7 is a screenshot of a graphical user interface (GUI) of a worm-tracking system of the present invention, such as the worm-tracking system of FIG. 2, illustrating a detection step of the workflow.
Figure 9:
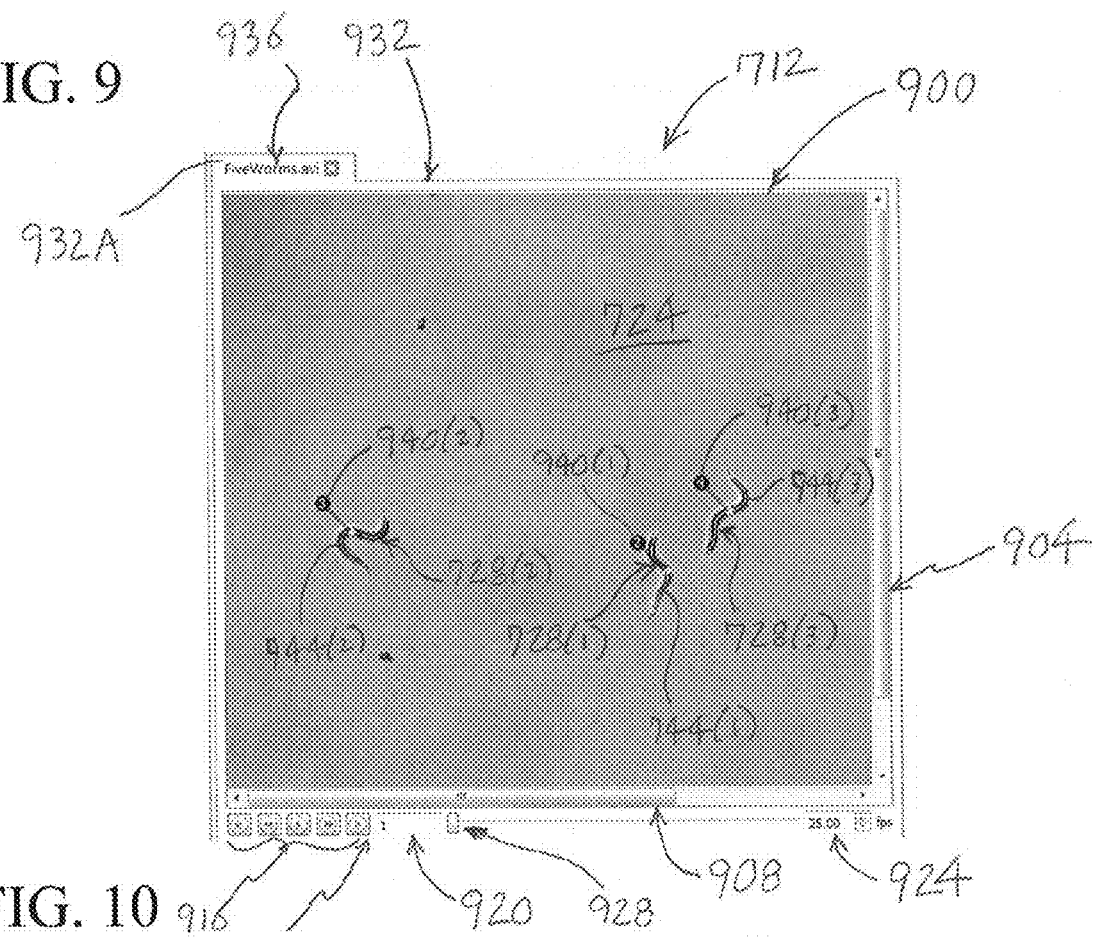
FIG. 9 is a snapshot of the video-display panel of the GUI of FIG. 7, illustrating three detected worms.
Figure 15:
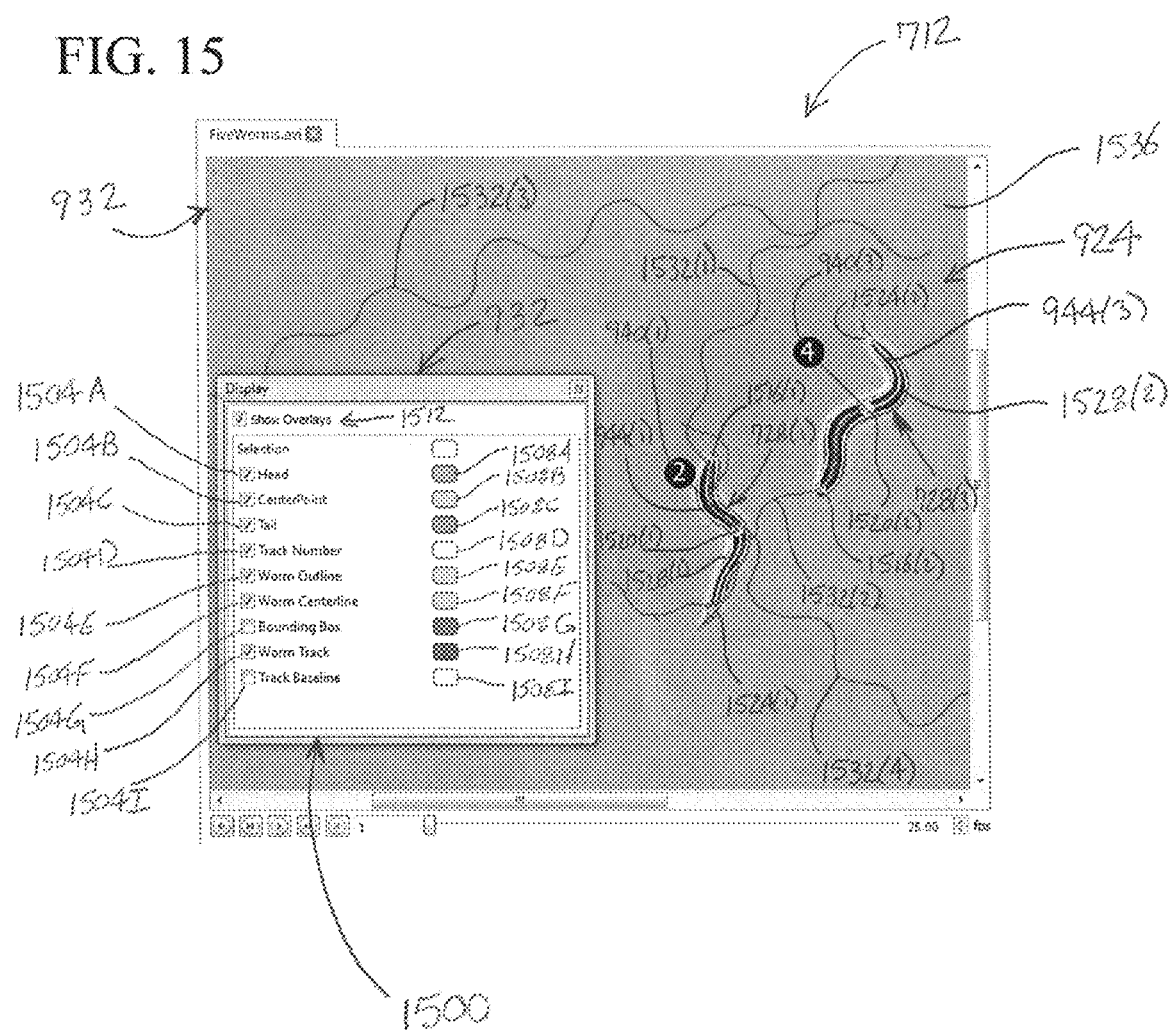
FIG. 15 is a snapshot of the video-display panel of the GUI of FIG. 7, illustrating the display of a worm video and a graphical overlay containing tracking information, showing the video-display panel overlaid by a display-selection pop-up menu.

At step 120, tracking information calculated at step 115 is displayed substantially simultaneously with the sequential display of the sequence of frames of the video at step 110. By "substantially simultaneously" it is meant that as soon as tracking information is calculated for a particular frame, visual representations of that information is displayed along with that frame so that the tracking information and the corresponding frame appear simultaneously to the viewer on the display. As noted above, tracking information can include, but not be limited to: an outline of each organism or portion thereof with respect to the current frame; the location(s) within the corresponding frame of one or more features of each organism, such as a head, tail, center point, longitudinal centerline; location(s) of one or more modeling points; direction of travel; speed of travel; association with previously established track. Correspondingly, visual representations of such information can include, but not be limited to: a graphical outline of the boundaries of each organism or portion thereof with respect to the current frame; visual marker(s) for the location(s) within the corresponding frame of one or more features of each organism, such as a head marker, tail marker, center point marker, longitudinal centerline marker; marker(s) for the location(s) of one or more modeling points; graphical indicator(s) for direction of travel; graphical indicator(s) for speed of travel; and graphical indication indicating association with previously established track. In some embodiments, the system may provide a user with an opportunity to selectively determine which visual indicators the system should display. In other embodiments, the system may not provide the user with that choice. Some exemplary visual indicators are illustrated in FIGS. 7, 9 and 15 and described below. However, it is noted that those visual indicators are merely exemplary and that many alternative indicators can be used to suit the particular application and/or a system designer's desires.

As should be apparent, steps 105, 110, 115, and 120 of method 100 represent an iterative process in which steps 115 and 120 are performed in rapid sequence for each one of the plurality of frames designated for being subject to the calculations at step 115. In other words, for each frame that is received at step 105 and displayed at step 110 and that is also designed for being subjected to the calculating of tracking information at step 115, steps 115 and 120 are performed substantially simultaneously with the display at step 110 and in sequence with one another so that the display of the tracking information at step 120 is performed effectively simultaneously with the display of the corresponding frame at step 110, with any delay being attributable to tracking-information-processing time and tracking-information-rendering time. As noted above, various features of the tracking, including the robustness of the shape and motion models utilized and multiple-hypothesis-reduction techniques used, allow for very fast processing of tracking information.

FIG. 2 illustrates an exemplary worm-tracking system 200 that implements tracking method 100 of FIG. 1. Referring to FIG. 2, worm-tracking system 200 is represented: by various workflow steps performed by a user, here, steps 205, 215, and 220; by various processing steps performed by the system (via a combination of hardware and software), here, steps 210, 225, 230, 235, 240, 245, 250, 255, 260, 265, and 270; and by various inputs needed to make the system work, here, a video file 275, a digital camera 280, and a set of deformable worm models 285.

At step 205, a user may either indicate starting and ending video frame numbers indicating the frames to process for tracking (for video from video file 275) or choose to begin tracking from a real-time video feed from digital camera 280.

At step 210, worm-tracking system 200 loads individual image frames for either a digital camera 280 or from a video data file 275, which may be stored on a local secondary storage device, such as a hard disk, optical disk, etc.

At step 215, the user may adjust a binary threshold value to obtain a reasonable separation of the image foreground (worms) from the image background. A binarized version of the current video frame is displayed so that the user can assess the effects of adjusting the threshold so as to optimize the value.

At step 220, the user may select the size and number of worms to track. To facilitate these selections, in one example worm-tracking system 200 may provide a feature that can be called "single-click object detection." With this feature, the user can select an object of interest (here, a worm) displayed on a suitable display, thereby causing worm-tracking system 200 to automatically detect that worm by measuring the object shape, including length, width profile, area, and other information. As those skilled in the art will readily appreciate, the selection can be effected by pointing and clicking techniques using a computer mouse, a track-ball device, etc., or, in touchscreen applications, by touching a touchscreen at an appropriate location, or, in virtual reality application, by making an appropriate gesture, among others. Upon detecting the selected worm, worm-tracking system 200 may immediately display the object contour, centerline, and metrics on the display. In addition to single-click, -touch, -gesture detection, the user may alternatively select an object to detect by drawing a contour around the object of interest or otherwise defining the general location of the object through appropriate user interaction with the visual display.

In some embodiments, worm-tracking system 200 may be configured to automatically adjust a shape filter according to each selected and subsequently detected object. Accordingly, at step 225 worm-tracking system 200 may adjust shape parameters (e.g., width, length, area) to cover the extended minimum to maximum range of all shape values of the collection of detected objects. Thus, as the user selects worms at step 220, worm-tracking system 200 automatically sets the detection parameters for worm size and shape range according to the group of selected worms. Adjusting the filter automatically based on detected objects relieves the user from having to manually specify a filter range for object detection. That said, in some embodiments, worm-tracking system 200 may be configured to allow the user to manually adjust a shape filter, for example, using one or more suitable user soft controls, such as a slider or dial, or inputs, such as numeric input field, among many others.

At step 230, tracking by system may begin, for example, in response to the user selecting a soft control, such as a "Start Tracking" soft button or the like. At step 230, the user may select other tracking parameters, such as parameters that dictate how long to track worms when the worms are at the image boundary or in contact (interacting) with each other, among others. At step 235, worm-tracking system 200 retrieves a succession of video frames either from video file 275 or directly from digital video camera 280.

At step 240, system 200 may perform image segmentation, for example, using thresholding to produce a binarized image with objects of interest in the foreground (pixel intensity=1.0) and all else in the background (pixel intensity 0.0). Image segmentation is a necessary step in order to perform object detection. In the present example, the software assumes that the intensity of pixels that belong to the worm follow a different distribution than the pixel intensity belonging to the background agar. In one example, image segmentation can be decomposed into the following series of steps: grayscale image filtering, thresholding, morphological filtering, and connected-components labeling. In connection with grayscale image filtering, each of Gaussian filtering and grayscale open filtering can optionally be performed. Morphological filtering can include, but not be limited to, using any one or more of erosion, dilating, opening, and closing morphological filtering operations. These and other morphological filtering operations are known in the image-processing arts. The morphological filtering can be optional. In addition, in the case of uneven background, worm-tracking system 200 may be optionally configured to provide the user the option to use a background gradient correction algorithm based on a grayscale top-hat filter. In some embodiments, filtering can be controlled by the user and be manually adjustable depending on the complexity of the images. In such embodiments, worm-tracking system 200 may include interactive tools for adjusting the image processing parameters and providing immediate visual feedback to the user.

At step 245, one or more worms are detected as a function of worm model 285. In one example, worm detection relies on measuring two points of high curvature (worm head and tail) from a closed two-dimensional contour modeled as a planar B-spline that serves to outline the worm shape. The worm contour is further divided into two longitudinal sides connecting the head and tail to one another. The worm centerline is robustly estimated as the curve that is equidistant to the longitudinal sides. From the computed centerline and contour, the various parameters of worm model 285 can be computed.

In one embodiment, worm model 285 includes two model components to track moving worms: 1) a geometric worm model component for modeling the shape of the worm and 2) a motion model component, which allows worm-tracking system 200 to progressively transform the worm into different shapes using a biologically-based model of peristaltic progression and bending or a separate motion model component for swimming and thrashing worms. Worm model data can, for example, be stored in a suitable data store as two sets of b-spline base coefficients—one set for the worm center line and another for the width profile.

In the present embodiment, the geometric worm model component of worm model 285 expresses the bending pattern or conformation of a worm in terms of a discreet series of spline parameters. The geometric worm model component has the following characteristics:
1) it is encoded independently of the resolution of the underlying image data;
2) it uses an extensible curvature-encoded centerline;
3) the curvature profile is modeled with a basis composed of 1-D cubic B-splines; and
4) the width profile defined by its amplitude along the central axis of the worm.

FIG. 3 illustrates an exemplary geometric worm model 300 that can be implemented by the geometric worm model component of worm model 285 of FIG. 2. Referring now to FIG. 3, in this embodiment, points, such as points 304(1) to 304(4), along a worm centerline 308 record a bending angle θ(u) from the previous segment and a width R(u). The parameter u is normalized over the range [−0.5, 0.5] such that M(0) is the center of the worm, M(−0.5) its tail, and M(0.5) its head. These points are modeled against a spline basis, from which smooth curves representing the centerline and the outer contours can be derived. In one example, the worm geometric model component models centerline 308 in terms of a continuous centerline curve Θ(u) described by a bend angle as a function of distance along its length 312. This one-dimensional bend angle function is modeled using a third order periodic B-spline base. In one example, $$\Theta(u) = \sum_{j=1}^{N_\Theta} \alpha_j \phi_j^k(u) \quad (1)$$

Geometric worm model 300 represents a worm as having a width profile R(u), which is the local width of the worm as a function of distance along its length. In one example, worm width profile R(u) is defined as a continuous function for the shape generalized radius as a function of distance along its length 312. In one example, the worm width profile R(u) is parameterized using a third order periodic B-spline base with $N_\Theta=8$ splines. In other examples, $N_\Theta$ may be an integer value other than 8.

$$R(u) = \sum_{j=1}^{N_\Theta} r_j \phi_j^k(u) \quad (2)$$

Geometric worm model 300 is defined as a two-dimensional surface 316 defined around centerline curve 308. The parameterized generative model is:

$$F(p) = L\left(\int_0^{\tau u} e_1(s)\,ds\right) + vR(u)e_2(\tau u) + T \tag{3}$$

with:

$$e_1(s) = \begin{bmatrix} \cos(\Theta(s)) \\ \sin(\Theta(s)) \end{bmatrix} \text{ and } e_2(s) = \begin{bmatrix} -\sin(\Theta(s)) \\ \cos(\Theta(s)) \end{bmatrix}$$

In conventional model-based approaches for *C. elegans* tracking, the natural variation of worm length 312 occurring during peristaltic progression is not accounted for. This impairs tracking accuracy and robustness. To overcome this limitation, the geometric worm model component of the present disclosure adds an elasticity factor T to the generative model. The elasticity factor acts as a length multiplier. A factor greater than one increases worm length 312 and a factor lower than one decreases it. This formalism requires the bend angle function $\Theta(u)$ to be defined outside its original support $[-0.5, 0.5]$ as $\Theta(-0.5)$ if $u<-0.5$ and $\Theta(0.5)$ if $u>0.5$.

In the present embodiment, the worm motion model component of worm model 285 (FIG. 2) expresses worm movement in terms of peristaltic progression, $\eta$, and deformation, $\beta$, i.e., change of the bend angle. This novel approach is powerful because it allows large scale bending to be modeled and does not restrict its scope of use to high frame rate videos. An elasticity factor, $\tau$, is also included in the worm motion model component.

Figure 4:
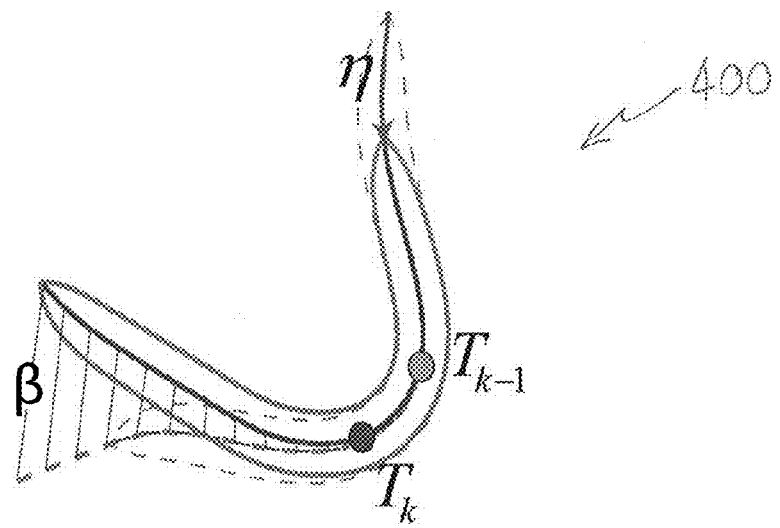
FIG. 4 is a diagram illustrating a worm motion model that can be used in a tracking system made in accordance with the present invention, such as the worm tracking system of FIG. 2.

FIG. 4 illustrates an exemplary worm motion model 400 that can be implemented by the worm motion model component of worm mode 285 of FIG. 2. Referring now to FIG. 4, worm motion model 400 can be extended and contracted, and the extremities can be bent through some varying angle, $\alpha$. In one example, the equations of motion calculate the predicted state vector after the worm has undergone peristaltic progression $\eta$, deformation $\beta$, and change of length $\Delta\tau$, and takes the form:

$$\begin{bmatrix} \alpha_k \\ T_k \\ \tau_k \end{bmatrix} = \begin{bmatrix} \Lambda(u)^{-1}\Lambda(u+\eta)\alpha_{k-1} \\ T_{k-1} \\ \tau_{k-1} \end{bmatrix} + \begin{bmatrix} \beta \\ \int_0^{\eta} e_1(s)\,ds \\ \Delta\tau \end{bmatrix} \tag{4}$$

Wherein, $\Lambda(u)$ is the matrix of B-spline bases evaluated at s sampled grid points in u.

Figure 5A:
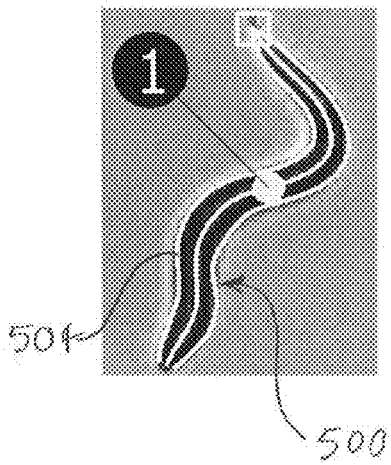
FIGS. 5A to 5C are a set of diagrams illustrating effects of a midpoint radial shift operator that can be implemented in a worm motion model made in accordance with the present invention.
Figure 5B:
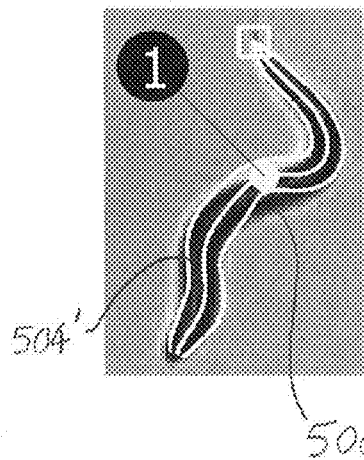
Figure 5C:
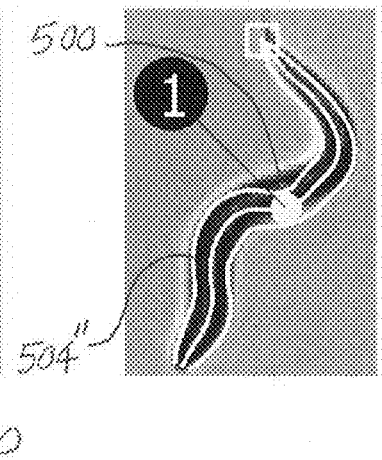

Motion model 400 allows for a radial degree of freedom at the midpoint located at position T. Radial displacement at the worm midpoint is considered negligible from one video frame to the next, but during tracking radial positioning error at the central location can have a cumulative effect resulting in detection and tracking failure as illustrated in FIGS. 5A to 5C. In FIG. 5A, a worm 500 is correctly fit by a worm model 504. However, in FIG. 5B worm model 504' has undergone a positive midpoint radial shift relative to worm model 504, and in FIG. 5C worm model 504" has undergone a negative midpoint radial shift relative to the worm. In the present embodiment, the worm motion model component of worm model 285 (FIG. 2) includes a midpoint radial shift operator designed to compensate for cumulative radial positioning error at the central location of each worm, and it is important for long-term tracking stability.

In the present example, the worm motion model component adds an additional degree of freedom to ensure long term tracking stability, namely, $$T_k = T_{k-1} + D \cdot e_2(0) \tag{5}$$

This radial displacement of the center of the worm is compensated for by a local change of the worm curvature $\theta_D$ localized at the worm mid-section $s \in [-0.12, 0.12]$:

$$\theta_D(s) = \begin{cases} \operatorname{atan}\left(\dfrac{D}{L \cdot 0.24}\right) & \text{if } s \in [-0.12, 0.12] \\ 0 & \text{otherwise.} \end{cases} \tag{6}$$

Incorporating radial shift and curvature correction via this midpoint radial shift operator into a motion model component, the equations of motion become:

$$\begin{bmatrix} \alpha_k \\ T_k \\ \tau_k \end{bmatrix} = \begin{bmatrix} \Lambda(u)^{-1}\Lambda(u+\eta)\alpha_{k-1} + \Lambda(u)^{-1}\theta_D \\ T_{k-1} \\ \tau_{k-1} \end{bmatrix} + \tag{7}$$

$$\begin{bmatrix} \beta \\ \int_0^{(\tau_{k-1})\cdot\eta} e_1(s)\,ds + D \cdot e_2(0) \\ \Delta\tau \end{bmatrix}$$

Referring again to FIG. 2, at step 250, tracking system 200 fits worm model 285 to each worm detected at step 245 by adjusting parameters for position and curvature. Worm-tracking system 200 iteratively adjusts worm model 285 to reduce the measured error between the worm image and its corresponding model. The number of iterations may be selectable by the user, and can be adaptively modified by worm-tracking system 200 to either increase or decrease the number of iterations over successive frames, depending on whether more or less iterations are required to meet a minimum error criteria.

In one example model estimation performed during tracking is made using a region-based approach. Fitting a parameterized worm region $R(\rho)$ with $\rho = (\eta, \beta, \tau, D)$, defined above, can be seen as an optimization process, wherein a quantity $J(\rho, \mu_i, \mu_o)$ is minimized with respect to the deformation parameter $\rho$ and appearance $(\mu_i, \mu_o)$.

$$J(\rho, \mu_i, \mu_o) = \iint_{R(\rho)} (I(X) - \mu_i)^2 dS + \iint_{\Omega \setminus R(\rho)} (I(X) - \mu_o)^2 dS \tag{8}$$

For a given shape parameter $\rho$, the optimal appearance levels $(\mu_i, \mu_o)$ are estimated as the average pixel intensity within their respective spatial supports $R(\rho)$ and $\Omega \setminus R(\rho)$, wherein $R(\rho)$ is the region inside the worm and $\Omega \setminus R(\rho)$ the region outside the worm.

Given known intensity values $(\mu_i, \mu_o)$, the problem is to estimate the shape deformation parameter $\rho$ that minimizes the objective function $J(\rho, \mu_i, \mu_o)$. Estimating $\rho$ is done using a gradient search that requires the derivative with respect to the deformation parameters. This gradient vector $F_\rho$ (also referred to as the fitting force) is defined as:

$$F_\rho = \frac{\partial J}{\partial \rho} = \int_C ((I(X) - \mu_o)^2 - (I(X) - \mu_i)^2) \frac{dX}{d\rho} N\,ds \tag{9}$$

Wherein:

C(ρ) is the contour around the region R(ρ);

N is the normal vector along the contour C;

$$\frac{dX}{d\rho}$$

is the shape derivative with respect to the deformation parameter p;

I(X) is the image intensity at location X;

$\mu_o$ is the mean background pixel intensity (outside the worm model); and $\mu_i$ is the mean foreground pixel intensity (inside the worm model).

Gradient vector $F_\rho$ provides worm-tracking system 200 with basic tools for fitting deformable worm model 285. Worm-tracking system 200 uses the fitting forces $F_\rho$ in conjunction with an iterative gradient search optimization approach to fit the worm templates to the image data. In one example, the Chan and Vese energy function is applied to the binary image. As a result, intensity values $\mu_i$ and $\mu_o$ are known quantities (0 and 1 for a binarized image) and need not be estimated.

Overlap between worms and self overlap (including coiling) within a single worm are common occurences and explain to a large part why tracking C. elegans worms can be such a challenging task. Indeed, others have handled these occurrences by simply not attempting to fit overlapped worms.

In contrast, some embodiments of a tracking system of the present disclosure, such as worm-tracking system 200 of FIG. 2, include a mechanism by which the measurement process for one worm is made "aware" of the position of other entities. To that end, in some embodiments worm-tracking system 200 can utilize an additional set of "interaction" pseudo-forces created by neighboring objects that will counteract a "fitting" force, $F_\rho$, and prevent two objects from occupying the same space. The principle behind this feature is that as a set of deformable objects deform and converge during the iterative process, they exert a force on each other's contours. In one example, the interaction force exercised by worm j on worm i is defined as:

$$F_{i|j} = \int_C -\text{Max}[1(S_i(X)), 1(S_j(X))] \frac{dX}{d\rho} N \, ds \qquad (10)$$

wherein 1(.) is the unit step function and $S_j$ is the inside/outside function defining the the spatial support of the worm j.

The model-fitting calculation uses the modified fitting force $F_\rho+F_{i|j}$ for each overlapping worm pair {i,j}. The combination of the fitting force and the interaction force improve fitting of worms when worms are touching or overlapping some other worm in the field of interest. Worm-tracking system 200 may use a gradient descent approach to adjust the worm model parameters to move in the direction that minimizes this sum.

In some embodiments, worm-tracking system 200 may use width profile to distinguish each worm's head from its tail, taking profiles, for example, for the first 15% of worm body at each extremity, and comparing the average widths at each end. In this context, "width profile" may be defined as the measurement of the width of the worm taken orthogonally to the centerline at regular intervals along the centerline from head to tail. The larger mean width indicates that the corresponding end is the head of the worm, and the smaller mean indicates that the corresponding end is the tail. These mean widths for each worm can be averaged over video or image frames of the worm along its track.

Worm-tracking system 200 may also be configured to detect "omega bending" of a worm (i.e., a bent worm shape in the form of uppercase Greek letter omega, Ω). In one example, worm-tracking system 200 may compute the bending angle, which can be defined as the angle between two lines—one line from the head of the worm to its center point, and the second line from the tail of the worm to that center point. If, for example, the bending angle is measured at less than 90 degrees over an extended number of video frames, the worm is designated as conforming to an omega bend. The number of video frames is adjustable according to time length, with a default of 0.67 seconds (20 frames at 30 frames per second) being used in a particular example. Other time lengths can be used to suit particular applications.

At step 255, worm-tracking system 200 can apply a worm-shape-validation filter to distinguish between worms and background artifacts. Shape parameters for the filter, which can include length, width:length ratio, and area, among others, may be, for example, updated automatically by worm-tracking system 200 when the user selects worms to track at step 220, described above. Worm-tracking system 200 can eliminate from further consideration all detected objects in the image that do not fall within the defined filter shape range.

At step 260, worm-tracking system 200 may associate each detected and modeled worm with a corresponding worm track. In one embodiment, worm-tracking system 200 associates track numbers with each moving object from one video frame to the next. Worm-tracking system 200 associates objects in a frame with tracks based on their proximity, direction of movement, and similarity of shape to objects from previous frames.

In some embodiments, worm-tracking system 200 can be configured to allow the user to specify maximum positional shift and maximum shape change of a worm from one video frame or image to the next. If a worm object is too far or too different in size from the worm in the previous frame, then a new track is started for the newly detected worm. Such a filter can be controlled by a position-tolerance parameter and a shape-tolerance parameter. Worm-tracking system 200 may use the position-tolerance parameter to determine how much of a position shift (e.g., as a decimal fraction of total body length) from the last item of a track to the current worm is acceptable. If the worm position is outside this value, worm-tracking system 200 generates a new worm track. Worm-tracking system 200 may use the shape-tolerance parameter to determine how much of a shape difference (e.g., in length and width) from the last item of the track to the current worm is acceptable. In one example, the default value is 0.30 (i.e., 30%) for each of the parameters. Other values can be used to suit particular applications and/or particular tracking scenarios and circumstances.

In some embodiments, worm-tracking system 200 can be configured to allow the user to specify whether worms at the boundary of the image should be tracked, and for how many frames. When worms overlap the image or video frame boundary, then part of the body is excluded from the image, making measurement of length, direction, and speed unreliable. In such embodiments, the user can choose to ignore worms that overlap the boundary by setting options within a user-interface of worm-tracking system 200. Examples of such options include a "Track Worms at Image Boundary"

option, which may be implemented, for example, using "yes" and "no" radio buttons, checkboxes, etc., and a "Number of Frames to Track at Boundary until Dropped" option, which may be implemented, for example, using a numeric input that allows the user to input a value from 1 to N, where N is the total number of images or video frames available or using a set of radio buttons corresponding to differing values for N, among others.

In some embodiments of a tracking system of the present invention, such as worm-tracking system 200 of FIG. 2, detection-to-track fusion can be achieved using a combined shape filtering (gating)/multiple hypothesis data association/temporal filtering approach. Shape filtering (gating) is a technique of data association for eliminating very unlikely detection-to-track pairs and/or performing a focused detection on a restricted region of space. A multiple hypothesis data association approach allows for a limited number of hypothesized measurements to be independently tracked and evaluated over time.

Figure 6:
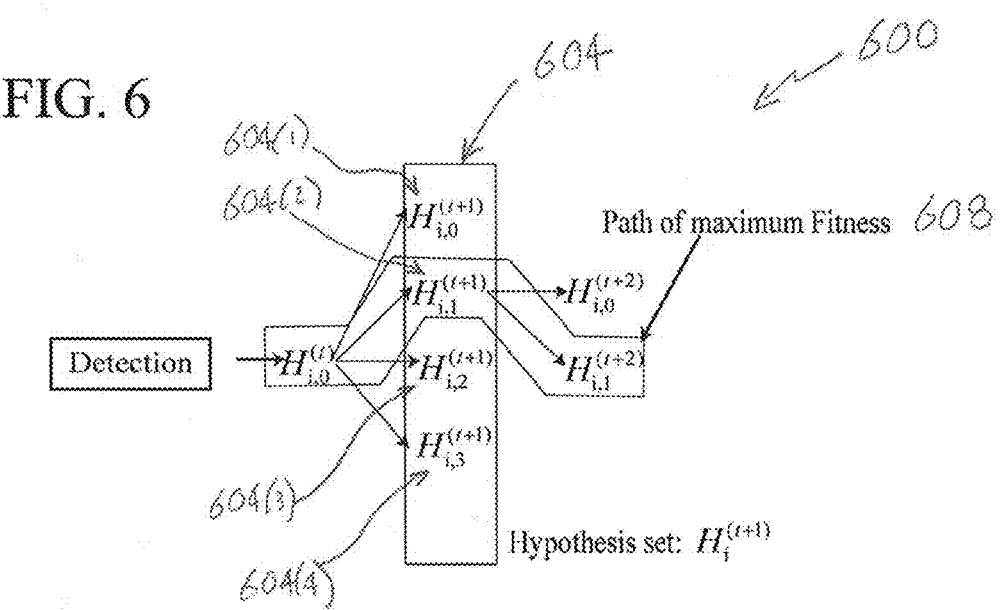
FIG. 6 is a graphical illustration of multiple tracking hypothesis reduction carried out over multiple frames of a video.

Specifically, it has been discovered from general tracking literature that in highly cluttered environments, conventional tracking systems can suffer from frequent mis-associations. To address this issue, some embodiments of a tracking system of the present disclosure, such as worm-tracking system 200 of FIG. 2, use a multiple hypothesis data association framework that maintains multiple data association hypotheses within a sliding window, thus addressing uncertainty or ambiguity that may result from the matching process. FIG. 6 illustrates a multi-hypothesis tracking scenario 600 over multiple frames, in which an original set 604 of multiple differing hypotheses, here hypotheses 604(1) to 604(4), is reduced over a plurality of successive frames as the tracking system learns that one or more of the hypotheses result in higher "fitnesses" (i.e., better fits) to the image data. In this example, hypotheses 604(2) defines a path of maximum fitness 608.

A multiple hypotheses tracking approach can be successfully applied to a chain of recursive estimation of worm shape to greatly improve tracking performance in cluttered environment. During the fitting process, it is very common for several hypotheses to converge toward the same worm position and shape, making these hypotheses redundant. The present embodiment implements an advanced hypotheses management system, wherein redundant hypotheses are detected and then discarded using a clustering algorithm (such as k-means clustering). Only representatives of the fittest clusters are now retained.

Some embodiments of a tracking system made in accordance with the present invention, such as embodiments of worm-tracking system 200 of FIG. 2, can permit a user to make one or more track corrections. As examples, worm-tracking system 200 may include user-interface tools to correct tracking data errors generated by the software by doing any one or more of the following:

1) Connect two worm tracks as a single track. A user may specify two worm track numbers, either by entering the track numbers or clicking on the worms and/or tracks in the appropriate video frames. The user may then choose to join the tracks. In one implementation, the tracking system replaces all instances of the later track number with the earlier track number.
2) Swap head and tail positions for all worms along a single track. The user may select one or more worms and then choose to swap head/tail positions. For each worm selected, the software swaps the designation of head and tail position for the worm over a range of tracks (from 1 to all) specified by the user.
3) Split a worm track into two separate tracks.
4) Delete a detected worm.
5) Confirm or deny automatedly joined worm tracks. In some embodiments, a tracking system of the present disclosure may automatically detect the close proximity of the end of one track and the start of a different track. If so, the tracking system may present a list of all close-pairs to the user at the relevant video frame and ask the user if the tracks in the pairs should be joined.
6) Manually retrace a worm (marking multiple points from head to tail along the centerline). The system may automatically adjust the centerline and estimate the width profiles of the worm, then connect this worm to an appropriate track if one is sufficiently close and the worm size and shape are consistent with the track.

Some embodiments of a tracking system made in accordance with the present invention, such as worm-tracking system 200 of FIG. 2, may include a backtracking feature that can improve the tracking of interacting tracked objects, such as worms. In the context of worm-tracking system 200 of FIG. 2, when the system newly detects worms, it marks their origination position in a worm model sequence. Once worm-tracking system 200 completes tracking through the successive frames in forward order (e.g., from the first frame to the last frame), the system can skip back to worm-origination points and begin tracking the newly detected worms in reverse direction. This backtracking can improve the overall tracking accuracy by back-tracking through entanglements and other interactions that could not be resolved with high confidence in the forward direction.

At step 265, worm-tracking system 200 may update the tracking data to reflect the changes the system determined from the most recent tracked frame. The tracking data can be the positional and shape data from the worm model, such as from the b-spline curves that make up the centerline and width profiles of the worms. In some embodiments and in conjunction with updating the tracking data, worm-tracking system 200 may update a graphical display based on the updated tracking data. For example, worm-tracking system 200 may present a graphical window displaying a single video or image frame of one or more worms with a graphical overlay of the computed worm outlines, centerlines, head marker, centerpoint marker, tail marker, track number, and track trajectory line, among other things. Exemplary screenshots appear in FIGS. 7 to 15 and are described below. Worm-tracking system 200 may also include options to show or hide each of these overlay elements. Worm-tracking system 200 updates the display of the graphical elements in real time, superimposed over the image in each frame, creating an animated view. This view can be available while tracking worms and also during playback after the tracking is complete.

In some embodiments, worm-tracking system 200 can be configured to display successive video frames in a window on a display at a frame rate designated by either video file 275, live camera feed 280, or the user. In addition, some embodiments can be enhanced so that while the video is playing in a forward or reverse direction, the user can adjust the display to increase or decrease the zoom level using either keystrokes (such as on the +/− keys), mouse gestures (e.g., mouse wheel roll), touchscreen gestures, 3D gestures, or the like. Embodiments can also be enhanced so that the user can also pan the display of the zoomed video in any direction (up, down, left, right, diagonal, other) by performing a mouse drag operation, touchscreen gesture, 3D gesture, or use arrow keys to pan the display.

In addition to updating of the graphical display, step 265 may also include the updating of stored tracking data. In one example, worm model data is represented as two sets of b-spline base coefficients—one set for the worm centerline and another for the width profile. From these coefficients, worm-tracking system 200 computes a set of sample points in (x,y) coordinates along the centerline and stores these points in a data table within the system. These points can be exported, if desired, to a data file on, for example, a disk or to a network-attached storage device. The format of this data can be in any suitable format, such as extended markup language (XML) format, text format such as comma separate value (CSV) format, and binary data format, among others. Worm-tracking system 200 may allow the user to select the number of sample points to export for each worm tracked through multiple frames. The minimum number of selectable points is three. In some embodiments, worm-tracking system 200 may be configured to store various additional tracking information, such as track numbers, shape data, position data (e.g., (x,y,z) coordinates), and image region associated with each object temporarily in volatile memory computer memory. In these embodiments, upon completion of tracking, this information can be written to secondary storage as a data file.

After processing tracking information for the current frame, if more frames of video file 275 or camera feed 280 have yet to be processed, the process loops can loop from step 265 back to step 235, and such looping can continue until worm-tracking system 200 has processed all designated frames, at which time tracking may end at step 270. In addition, worm-tracking system 200 may also be provided with an "End Tracking" or similar soft control that allows the user to end the tracking (processing).

As mentioned above FIGS. 7-15 contain screenshots of a graphical user interface (GUI) 700 of an exemplary instantiation of worm-tracking system, such as system 200, made in accordance with the present invention. As those skilled in the art will readily appreciate, GUI 700 illustrated in these figures is merely one example of a GUI that can be implemented. Skilled artisans can develop and design GUIs having a different look and feel from GUI 700, yet still achieve some, all, or more of the functionalities illustrated in connection with GUI 700, including the functionalities described and mentioned above.

Figure 8:
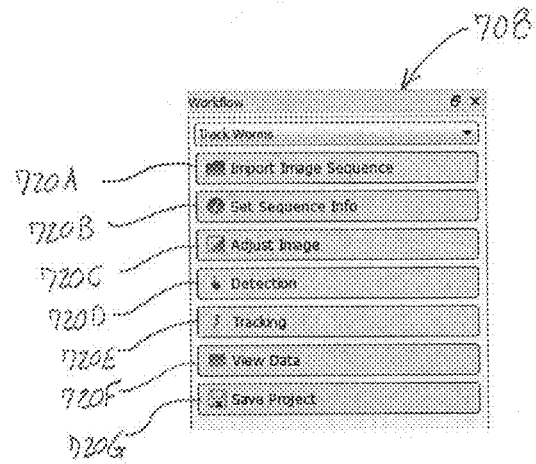
FIG. 8 is a snapshot of the workflow menu of the GUI of FIG. 7, highlighting workflow steps a user can take during a worm-tracking session.

Turning first to FIG. 7, this figure is a full-screen view of a primary screen 704 of GUI 700. In this example, primary screen 704 is partitioned into three primary panels, namely, a workflow panel 708, a video-viewing panel 712, and an options panel 716. As described in more detail below, workflow panel 708 contains a plurality of selectors 720A to 720G corresponding to steps within a workflow for detecting and tracking worms. Each selector 720A to 720G can be selected by a user to change the information and option displayed in options panel 716. In the example shown, "Detection" selector 720D is shown as being selected, and, correspondingly, options panel 716 displays options for detecting worms in the video displayed in video-viewing panel 708. When a user selects another one of selectors 720A to 720G in workflow panel 708, the underlying software changes the contents of options panel 716 accordingly. This is illustrated below in connection with FIG. 10. FIG. 8 illustrates workflow panel 708 in an enlarged manner, illustrating more particularly that workflow step selectors 720A to 720G are laid out in an easy to navigate style and are arranged in order of typical progression through a tracking session.

Video-viewing panel 712 allows a viewer to view and control a video 724 containing worms to be tracked. In the example shown, video 724 is illustrated stopped at a frame containing three worms 728(1) to 728(3). FIG. 9 contains an enlarged view of video-viewing panel 712 for ease of presentation. Referring now to FIG. 9, video-viewing panel 712 includes a display region 900 where video 724 appears. Depending on the frame format of video 724 and the magnification, display region 900 may contain vertical and horizontal scroll controls, such as vertical and horizontal scroll bars 904 and 908, respectively. In this example, video-viewing panel 712 includes a video-control region 912 containing a set of control selectors 916 for starting, stopping, pausing, advancing, and reversing the playing of video 724. Video panel 712 also includes a frame counter 920 that displays the number of the frame of video 724 currently displayed in display region 900, a frames-per-second selector 924 that allows a user to change the display rate of the video, and a video scrubbing control 928 that allows a user to rapidly move the video to a desired frame. Also in this example, video 724 is displayed in a display window 932 having a tab 932A that displays the filename 936 of the video being displayed in window 932. Although not shown, video-viewing panel 712 can have multiple display windows open simultaneously, with the user being able to activate any one of the multiple display windows via selecting the corresponding tab. As also seen in FIG. 9, each worm 728(1) to 728(3) includes a corresponding identifier, here a numeral 940(1) to 940(3), and detection information, here a centerline 944(1) to 944(3). Other detection information, as well as tracking information, is illustrated in FIG. 15 and described below.

Figure 10:
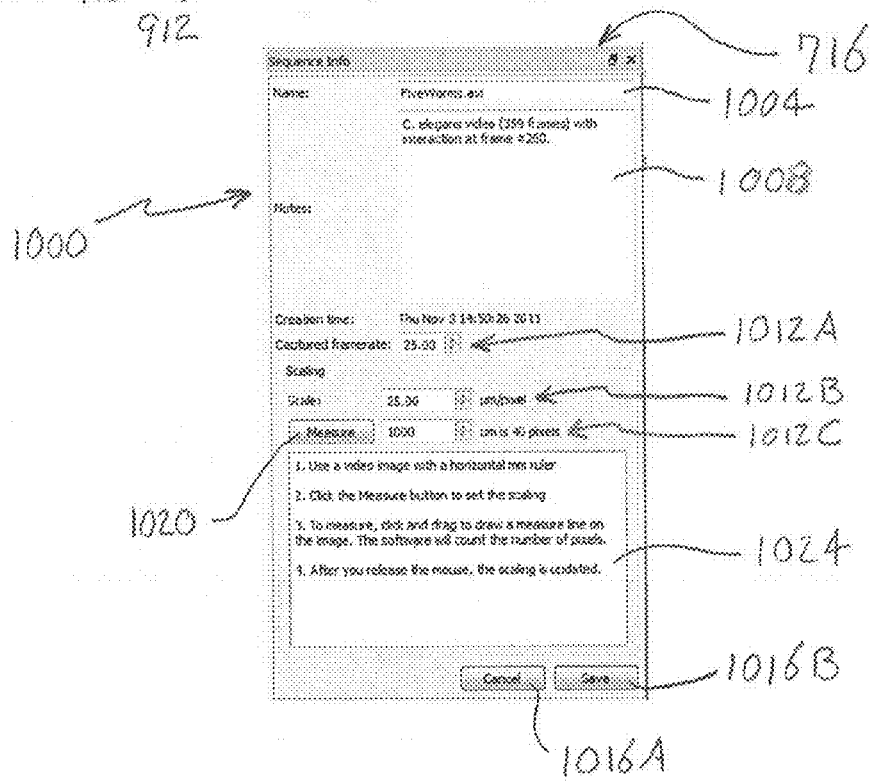
FIG. 10 is a snapshot of the workflow-step tool panel of the GUI of FIG. 7 when the "Set Sequence Info" workflow step has been selected in the workflow menu of FIGS. 7 and 8.

FIG. 10 illustrates parameter pane 716 (see also FIG. 7) when a user has selected "Set Sequence Info" selector 720B of FIGS. 7 and 8. As seen in FIG. 10, options panel 716 contains a "Sequence Info" user interface (UI) 1000 that presents to and/or allows a user to specify various information about the video sequence that is the current subject of interest, here video 724 (FIG. 7) having the filename "FiveWorms.avi" as indicated in a filename field 1004 of the "Sequence Info" UI. In this example "Sequence Info" UI 1000 also includes a notes field 1008 that allows a user to input any desired notes, such as notes about video 724 (FIG. 7) generally and/or notes about particular things of interest about the video, such as a description and/or label of the specimen, experimental conditions, etc. Also in this example, "Sequence Info" UI 1000 includes controls 1012A to 1012C that allow a user to specify frame rate and scaling settings, among other self-evident features that can be seen in FIG. 10, such as "Cancel" and "Save" controls 1016A and 1016B, respectively, that provide the named functionality. In this example, "Sequence Info" UI also includes a "Measure" control 1020 and corresponding comment field 1024 that contains comments on how to use the measuring functionality available via "Measure" control 1020 and other operations as described in the comment field.

Figure 11:
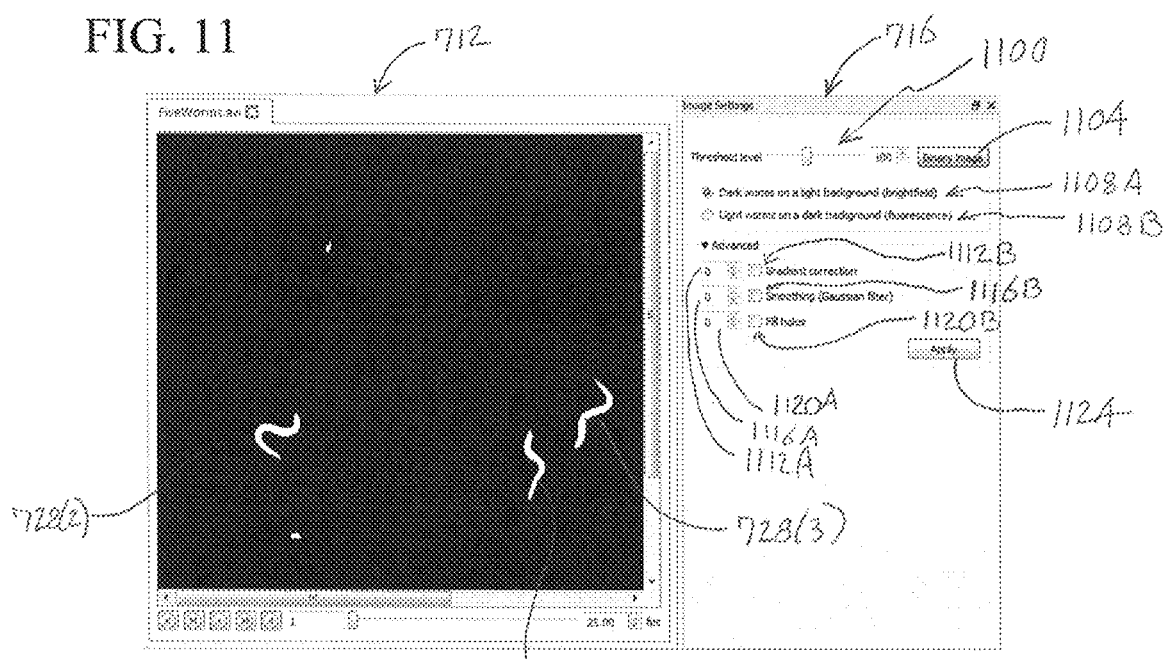
FIG. 11 is a snapshot of the video-display and workflow-step panels of the GUI of FIG. 7 when the "Adjust Image" workflow step has been selected in the workflow menu of FIGS. 7 and 8.

FIG. 11 illustrates video-viewing panel 712 and options panel 716 (see also FIG. 7) when a user has selected "Adjust Image" control 720C of FIGS. 7 and 8 and during user-adjustment of image level to obtain a reasonable segmentation of the image foreground (here, worms 728(1) to 728(3)) from the image background. In the example of FIG. 11, the image setting control provided includes a "Threshold level" control 1100, a "Binary Image" control 1104, brightfield/fluorescence selectors, here radio-type selectors 1108A and 1108B, a "Gradient correction" selector 1112A and corresponding control 1112B, and "Smoothing (Gaussian filter)" selector 1116A and corresponding control 1116B, a "Fill holes" selector 1120A and corresponding control 1120B, and an "Apply" button 1124. The advanced parameter selectors 1112A, 1116A, 1120A and corresponding respective controls 1112B, 1116B, 1120B allow a user to correct background gradients and smooth noise.

Figure 12:
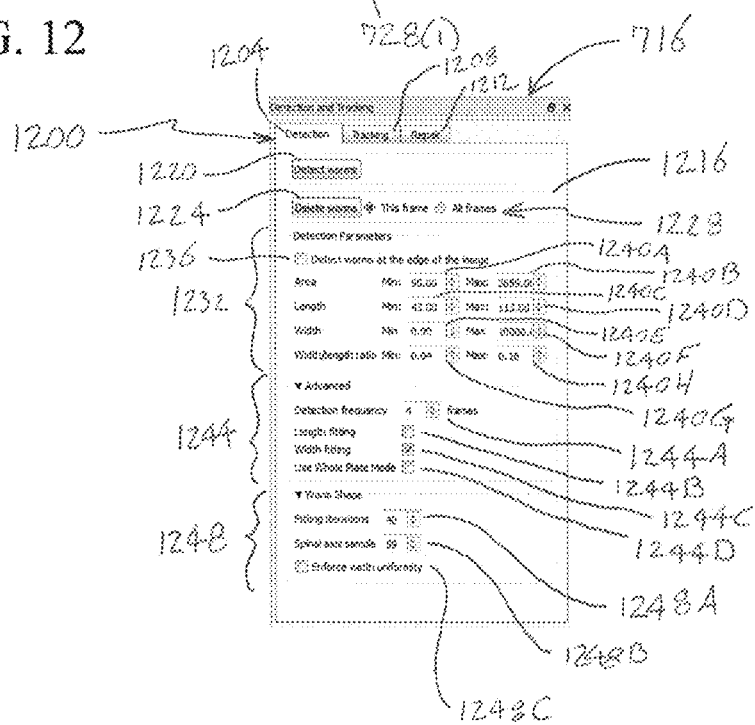
FIG. 12 is a snapshot of the workflow-step tool panel of the GUI of FIG. 7 when the "Detection" workflow step has been selected in the workflow menu of FIGS. 7 and 8, showing the "Detection" tab of the tool being selected.
Figure 13:
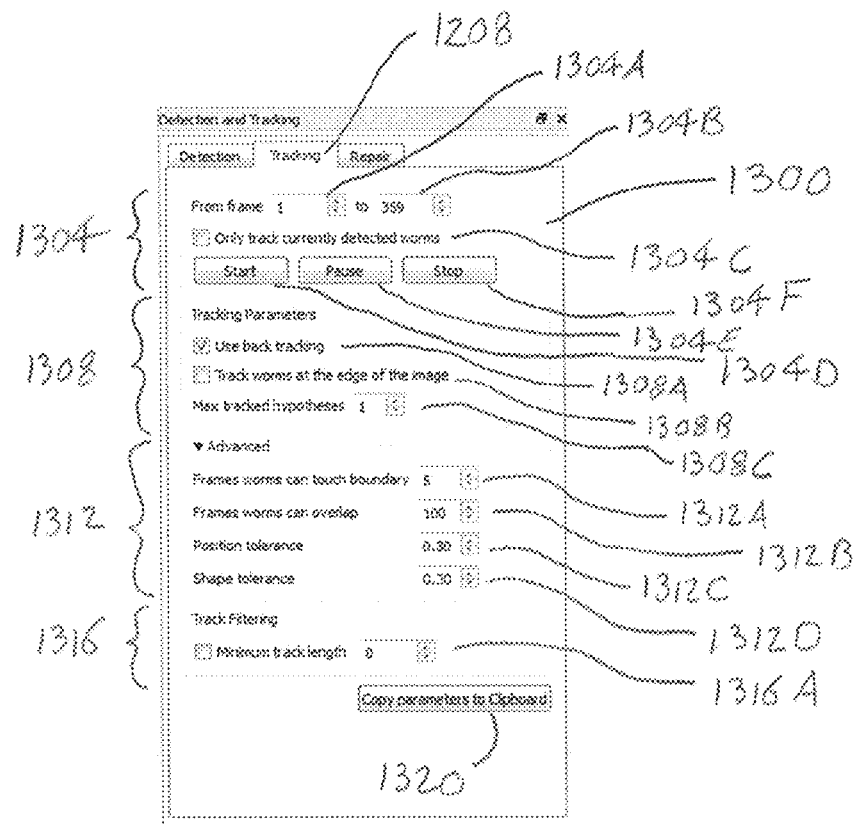
FIG. 13 is a snapshot of the workflow-step tool panel of the GUI of FIG. 7 when the "Detection" workflow step has been selected in the workflow menu of FIGS. 7 and 8, showing the "Tracking" tab of the tool being selected.
Figure 14:
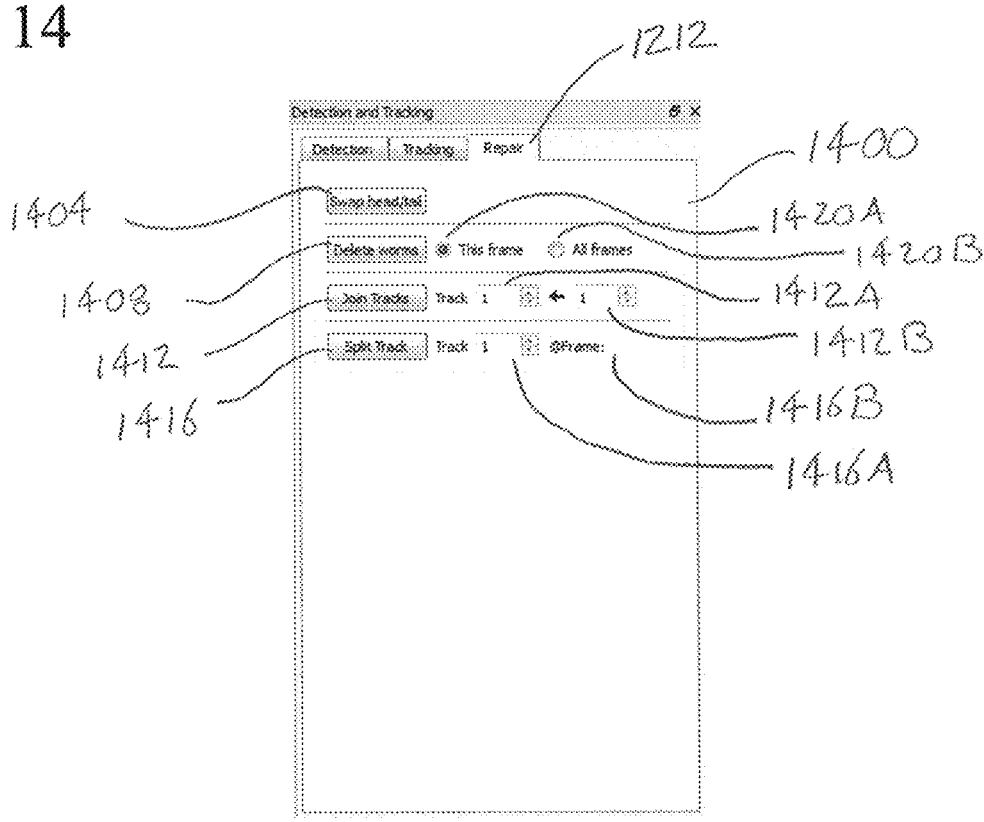
FIG. 14 is a snapshot of the workflow-step tool panel of the GUI of FIG. 7 when the "Detection" workflow step has been selected in the workflow menu of FIGS. 7 and 8, showing the "Repair" tab of the tool being selected.

FIGS. 12 to 14 show a "Detection and Tracking" UI 1200 when a user has selected "Detection" control 720D of FIGS.

7 and 8. As seen in FIG. 12, in this example "Detection and Tracking" UI 1200 has three tabs, namely a "Detection" tab 1204, a "Tracking" tab 1208, and a "Repair" tab 1212, which are illustrated, respectively, in FIGS. 12, 13, and 14. Referring first to FIG. 12, user selection of "Detection" tab 1204 reveals a "Detection" panel 1216 having a variety of options for the detection of worms, such as worms 728(1) to 728(3) (FIG. 7) of video 724. These options include a "Detect worms" control 1220 that allows a user to cause the worm-tracking software to detect worms in the current frame, here in video 724 (FIG. 7) and a "Delete worms" control 1224, along with corresponding "This frame" and "All frame" radio buttons 1228 that allow a user to cause the worm-tracking software to enter a mode in which the user can remove one or more worms from the set of worm(s) the software has detected in a current frame or all frames of the video.

"Detection" panel 1216 also includes a worm parameter input region 1232 that includes a selector 1236 that allows a user to instruct the software to detect worms at an edge of an image, as well as controls 1240A to 1240H that allow a user to set numerical values relating to the size of the worms to be detected, here, minimum and maximum areas (controls 1240A and 1240B), minimum and maximum lengths (controls 1240C and 1240D), minimum and maximum widths (controls 1240E and 1240F), and minimum and maximum width/length ratios (controls 1240G and 1240H). It is noted that the worm-tracking software can be configured to allow a user to select one or more worms to set the parameters in worm parameter input region 1232. For example, the software can be configured so that when a user "clicks" on or otherwise identifies a worm to the software (such as using touchscreen input or using an onscreen graphical boundary tool), the software automatically updates the numerical values within controls 1240A to 1240H as a function of the area(s), dimensions, and width/length ratio(s) of the selected worm(s). If multiple worms are selected, such as using an onscreen graphical boundary tool or clicking multiple worms using a mouse, the numerical values may be, for example, high and low values across the multiple worms or numerical averages, or some other set of values based on mathematical manipulations.

"Detection" panel 1216 further includes an "Advanced" parameter region 1244 and a "Worm Shape" region 1248 for allowing a user to set additional parameters. In this example, "Advanced" parameter region 1244 includes: a "Detection frequency" control 1244A that allows a user to set how frequently, by number of frames, to perform an image-wide detection of new worms (i.e., as opposed to performing only localized detection and to continue tracking worms already detected) and "Length fitting", "Width fitting", and "Use Whole Plate Mode" selectors 1244B to 1244D that allow a user to select algorithms within the worm-tracking software that allow for more precise fitting of the worm model if needed. In this example, "Worm Shape" region 1248 includes: a "Fittings iterations" control 1248A, a "Spinal axis sample" control 1248B, and an "Enforce width uniformity" selector 1248C that collectively allow a user to increase the resolution of the worm model and adjust the number of iterations the worm-tracking software is to adjust the worm model during fitting.

Referring now to FIG. 13, this figure illustrates a "Tracking" panel 1300 that is revealed in response to a user selecting "Tracking" tab 1208 (see also FIG. 12). In this example, "Tracking" panel 1300 includes a video control region 1304, a "Tracking Parameters" region 1308, and "Advanced" parameter region 1312, and a "Track Filtering" region 1316. Video control region 1304 includes controls 1304A and 1304B that allow a user to set the range of frames of the video, such as video 724 of FIG. 7, over which the worm-tracking software is to track worms. Also included are a selector 1304C that permits a user to cause the worm-tracking software to track only currently detected worms. This can be useful, for example, where extraneous worms exist in the frames of interest and/or worms that are not of interest enter and/or exit the video frame over the frames of interest. In this example, video control region 1304 also includes "Start", "Pause", and "Stop" controls 1304D to 1304F, respectively, that allow a user to control tracking in real time as the video, such as video 724 is playing in video-display region 712 of GUI 700 of FIG. 7. That said, worm-tracking software may be configured so that it stops tracking automatically after it has processed the last frame in the selected frame sequence, as indicated in control 1304B.

In the embodiment shown, "Tracking Parameters" region 1308 includes a "Use back tracking" selector 1308A, a "Track worms at the edge of the image" selector 1308B, and a "Max tracked hypotheses" control 1308C. When a user selects "Use back tracking" selector 1308, worm-tracking software implements back tracking, which is discussed above in connection with FIG. 2 and can improve tracking accuracy through worm interactions by tracking in the reverse direction to help resolve model-fitting ambiguities. Regarding "Max tracked hypotheses" control 1308C, the numerical value input by a user instructs the worm-tracking software as to how many hypotheses to track simultaneously. Multiple hypotheses tracking is described above in connection with FIG. 2. The lower the number of hypotheses tracked, the less computation time is required for tracking calculations.

"Advanced" parameter region 1312 in this example includes a "Frames worms can touch boundary" control 1312A, a "Frames worms can overlap" control 1312B, a "Position tolerance" control 1312C, and a "Shape tolerance" control 1312D. "Frames worms can touch boundary" control 1312A and "Frames worms can overlap" control 1312B allow a user to set numerical values indicating the number of frames for each parameter. The worm-tracking software uses these values to control how long, in terms of number of frames, that certain worms should be tracked before tracking is discontinued. "Position tolerance" control 1312C and "Shape tolerance" control 1312D allow a user to set numerical values that indicate to the worm-tracking software when a worm that has shifted in position and/or size from one detection frame to another detection frame is considered the same worm or a new worm. "Track Filtering" region 1316 contains a "Minimum track length" selector 1316A and corresponding control 1316B that allow a user to select and deselect application of this parameter and set a numerical value for the minimum track length to be reported. The worm-tracking software can be configured to eliminate short worm tracks from reporting that may be due to tracking of non-moving worms. In this example, "Tracking" panel 1300 also includes a "Copy Parameters to Clipboard" control 1320 that allows a user to easily port the set parameters to another worm-tracking session for another video.

FIG. 14 illustrates a "Repair" panel 1400 that is revealed in response to a user selecting "Repair" tab 1212 (see also FIG. 12). "Repair" panel 1400 provides a user with a variety of unique functionalities that allow a user to repair detection and tracking errors and other issues that may arise. In this example, "Repair" panel 1400 includes a "Swap head/tail" button 1404, a "Delete worms" button 1408, a "Join Tracks" button 1412, and a "Split Track" button 1416. A user selection of "Swap head/tail" button 1404 causes the worm-tracking software to enter into a mode wherein a user can select one or more worms, such as by point-and-click or other selection operation(s) within video-viewing panel 712 (FIG. 7), for which the software is to switch the head and tail positions determined by worm model. Upon a user selection of "Delete worms" button 1408, the worm-tracking software deletes all detected worms from only the current frame via a user-selection of a "This frame" radio button 1420A or over all frames via a user-selection of an "All frames" radio button 1420B.

If a user observes that the worm-tracking software has created two or more tracks for a single worm, the user can join the tracks together by selecting "Join Tracks" button 1412. For three or more tracks to be joined, the user can iteratively join together two tracks at a time until all of the tracks are joined into a single track. When tracks are joined, the worm-tracking software may use the track number of the lower-number track for the combined track, eliminating the higher track number and, if the worm-tracking software is so configured, renumber all of the track numbers based on the eliminated track number(s). "Repair" panel 1400 includes "Track" controls 1412A and 1412B that a user uses to indicate the track numbers of the tracks to be joined together into a single track. Tracking of a single worm can result in multiple tracks for a variety of reasons, such as the detection interval being set too large at "Detection frequency" control 1244A of FIG. 12 relative to the positional tolerance set at "Position tolerance" control 1312C, among others.

In contrast to joining multiple worm tracks caused by tracking errors for a single worm, situations can arise in which the worm-tracking software creates a single track for multiple worms. This may occur, for example, when two worms become entangled and the software cannot properly resolve the entanglement, such as when a user does not activate the back tracking feature at back tracking selector 1308 of FIG. 13. In such cases, a user may resolve the mis-tracking by designating the track number of the track to be split using a "Track" control 1416A and designating a frame number of the frame at which the track is to be split using an "@Frame:" control 1416B and then selecting "Split Track" button 1416. These actions cause the worm-tracking software to split the original track into two. In one example, the worm-tracking software retains the track number of the track generated up to the designated frame for that track and assigns a new track number to the new track resulting from the split, i.e., the track starting at the designated frame number. The editing tools provided by "Repair" panel 1400 are unique and can be very useful to researchers and others using worm-tracking or other tracking software made in accordance with the present invention.

As mentioned above, FIG. 15 illustrates detection and tracking information that can be provided to a user within video-viewing panel 712 (see also FIG. 7). As those skilled in the art will understand, each piece of information can be represented and visually displayed within display window 932 (see also FIG. 9) using a corresponding graphical overlay layer that overlays video 724 as it is being displayed in the display window. In the present embodiment, a user can select which overlay layers to show within display window 932 using an overlay-selection window 1500. In the embodiment shown, overlay-selection window 1500 includes selectors 1504A to 1504I for turning on and off, respectively, overlay layers that graphically display graphical information designating worm heads ("Head" selector 1504A), worm center points ("CenterPoint" selector 1504B), worm tails ("Tail" selector 1504C), track numbers ("Track Number" selector 1504D), worm outlines ("Worm Outline" selector 1504E), worm centerline ("Worm Centerline" selector 1504F), bounding boxes ("Bounding Box" selector 1504G), worm tracks ("Worm Track" selector 1504H), and track baselines ("Track Baseline" selector 1504I). Each selector 1504A to 1504I may be complemented by a corresponding color, which can be changed as desired using corresponding respective color control 1508A to 1508I, each of which displays the currently selected color. When a user clicks on or otherwise selects one of color controls 1508A to 1508I, the worm-tracking software opens a suitable color selector (not shown) in which the user can select a desired color for the corresponding indicator. In this example, overlay-selection window 1500 also includes a "Show Overlays" selector 1512 that allows a user to turn off and on all overlay layers currently selected using selectors 1504A to 1504I. Those skilled in the art will readily understand how to devise alternative means for graphically displaying detection and tracking information.

As can be seen in overlay selection window 1500, the following selectors are indicated as being selected: "Head" selector 1504A; "CenterPoint" selector 1504B; "Tail" selector 1504C; "Track Number" selector 1504D; "Worm Outline" selector 1504E; "Worm Centerline" selector 1504F; and "Worm Track" selector 1504H. Correspondingly, display window 932 is illustrated as displaying the corresponding respective layers, as evidenced, respectively, by head markers 1516(1) and 1516(2), center-point markers 1520(1) and 1520(2), tail markers 1524(1) and 1524(2), track numerals 940(1) and 940(3), worm outlines 1528(1) and 1528(2), worm centerlines 944(1) and 944(3), and worm tracks 1532(1) to 1532(4). It is noted that worm tracks 1532(1) and 1532(2) corresponding to worms 728(1) and 728(3), respectively, while worm tracks 1532(3) and 1532(4) correspond to worms that are no longer in the current frame 1536 of video 924 (see also FIG. 9).

It is to be noted that any one or more of the aspects and embodiments described herein may be conveniently implemented using one or more machines (e.g., one or more computing devices that are utilized as a user computing device for an electronic document, one or more server devices, such as a document server) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software modules.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk (e.g., a conventional floppy disk, a hard drive disk), an optical disk (e.g., a compact disk "CD", such as a readable, writeable, and/or re-writable CD; a digital video disk "DVD", such as a readable, writeable, and/or rewritable DVD), a magneto-optical disk, a read-only memory "ROM" device, a random access memory "RAM" device, a magnetic card, an optical card, a solid-state memory device (e.g., a flash memory), an EPROM, an EEPROM, and any combinations thereof. A machine-readable medium, as used herein, is intended to include a single medium as well as a collection of physically separate media, such as, for example, a collection of compact disks or one or more hard disk drives in combination with a computer memory. As used herein, a machine-readable storage medium does not include a signal.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a personal digital assistant "PDA", a mobile telephone, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 16:
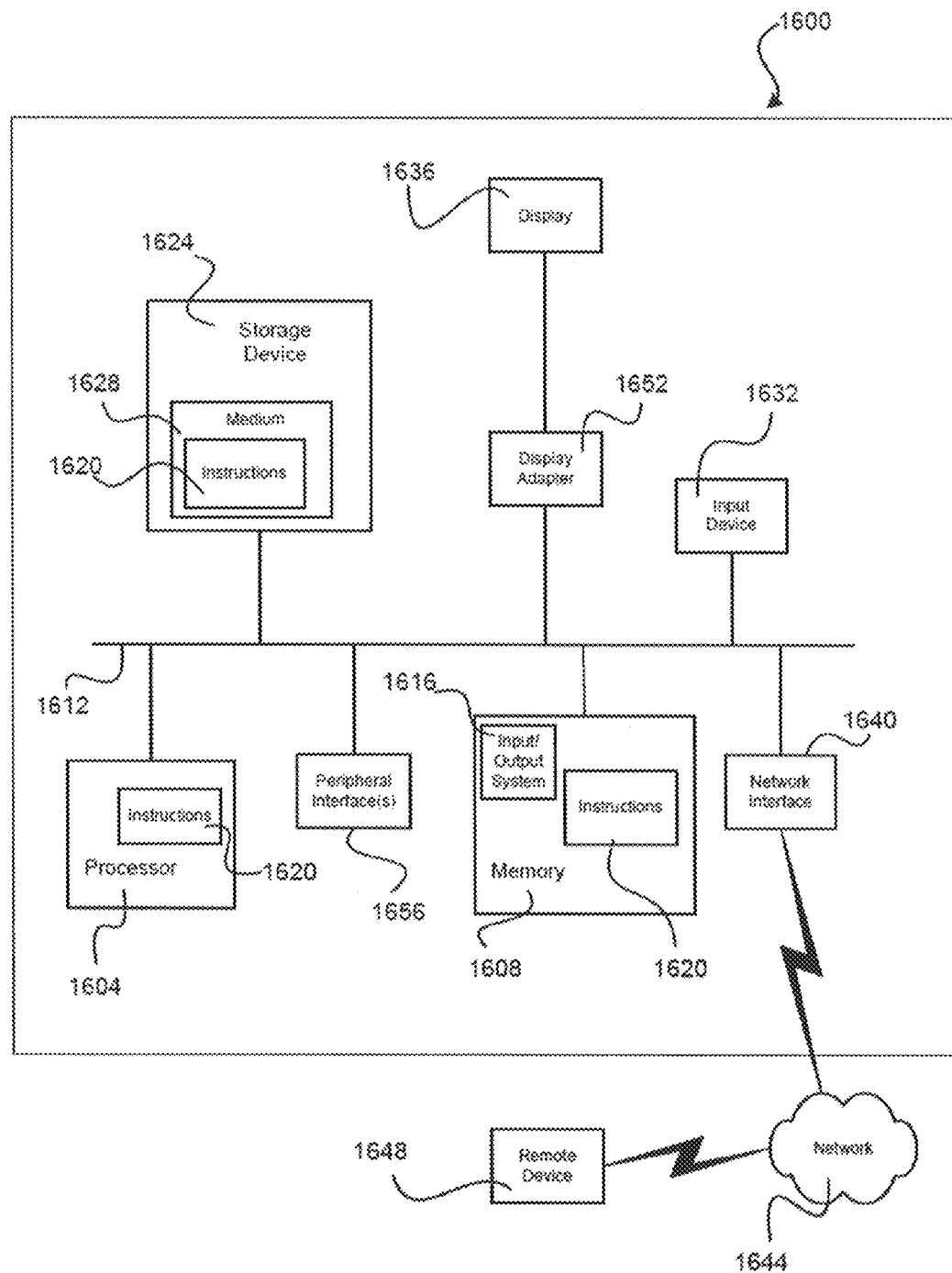
FIG. 16 is a high-level schematic diagram of a computing system that can be used to implement any one or more aspects of the worm-tracking methodologies of the present disclosure.

FIG. 16 shows a diagrammatic representation of one embodiment of a computing device in the exemplary form of a computer system 1600 within which a set of instructions for enabling functionalities of an organism-tracking system, such as worm-tracking system 200 of FIG. 2, to perform any one or more of the aspects and/or methodologies of the present disclosure, such as the methodologies of method 100 of FIG. 1, may be executed. It is also contemplated that multiple computing devices may be utilized to implement a specially configured set of instructions for causing the device to perform any one or more of the aspects and/or methodologies of the present disclosure. Computer system 1600 includes a processor 1604 and a memory 1608 that communicate with each other, and with other components, via a bus 1612. Bus 1612 may include any of several types of bus structures including, but not limited to, a memory bus, a memory controller, a peripheral bus, a local bus, and any combinations thereof, using any of a variety of bus architectures.

Memory 1608 may include various components (e.g., machine readable media) including, but not limited to, a random access memory component (e.g, a static RAM "SRAM", a dynamic RAM "DRAM", etc.), a read only component, and any combinations thereof. In one example, a basic input/output system 1616 (BIOS), including basic routines that help to transfer information between elements within computer system 1600, such as during start-up, may be stored in memory 1608. Memory 1608 may also include (e.g., stored on one or more machine-readable media) instructions (e.g., software) 1620 embodying any one or more of the aspects and/or methodologies of the present disclosure. In another example, memory 1608 may further include any number of program modules including, but not limited to, an operating system, one or more application programs, other program modules, program data, and any combinations thereof.

Computer system 1600 may also include a storage device 1624. Examples of a storage device (e.g., storage device 1624) include, but are not limited to, a hard disk drive for reading from and/or writing to a hard disk, a magnetic disk drive for reading from and/or writing to a removable magnetic disk, an optical disk drive for reading from and/or writing to an optical medium (e.g., a CD, a DVD, etc.), a solid-state memory device, and any combinations thereof. Storage device 1624 may be connected to bus 1612 by an appropriate interface (not shown). Example interfaces include, but are not limited to, SCSI, advanced technology attachment (ATA), serial ATA, universal serial bus (USB), IEEE 1294 (FIREWIRE), and any combinations thereof. In one example, storage device 1624 (or one or more components thereof) may be removably interfaced with computer system 1600 (e.g., via an external port connector (not shown)). Particularly, storage device 1624 and an associated machine-readable medium 1628 may provide nonvolatile and/or volatile storage of machine-readable instructions, data structures, program modules, and/or other data for computer system 1600. In one example, software 1620 may reside, completely or partially, within machine-readable medium 1628. In another example, software 1620 may reside, completely or partially, within processor 1604.

Computer system 1600 may also include an input device 1632. In one example, a user of computer system 1600 may enter commands and/or other information into computer system 1600 via input device 1632. Examples of an input device 1632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), touchscreen, and any combinations thereof. Input device 1632 may be interfaced to bus 1612 via any of a variety of interfaces (not shown) including, but not limited to, a serial interface, a parallel interface, a game port, a USB interface, a FIREWIRE interface, a direct interface to bus 1612, and any combinations thereof. Input device 1632 may include a touch screen interface that may be a part of or separate from display 1636, discussed further below. Input device 1632 may be utilized as a user selection device for selecting one or more graphical representations in a graphical interface as described above.

A user may also input commands and/or other information to computer system 1600 via storage device 1624 (e.g., a removable disk drive, a flash drive, etc.) and/or network interface device 1640. A network interface device, such as network interface device 1640 may be utilized for connecting computer system 1600 to one or more of a variety of networks, such as network 1644, and one or more remote devices 1648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1644, may employ a wired and/or a wireless mode of communication. In general, any network topology may be used. Information (e.g., data, software 1620, etc.) may be communicated to and/or from computer system 1600 via network interface device 1640.

Computer system 1600 may further include a video display adapter 1652 for communicating a displayable image to a display device, such as display device 1636. Examples of a display device include, but are not limited to, a liquid crystal display (LCD), a cathode ray tube (CRT), a plasma display, a light emitting diode (LED) display, and any combinations thereof. Display adapter 1652 and display device 1636 may be utilized in combination with processor 1604 to provide graphical representations of aspects of the present disclosure. In addition to a display device, a computer system 1600 may include one or more other peripheral output devices including, but not limited to, an audio speaker, a printer, and any combinations thereof. Such peripheral output devices may be connected to bus 1612 via a peripheral interface 1656. Examples of a peripheral interface include, but are not limited to, a serial port, a USB connection, a FIREWIRE connection, a parallel connection, and any combinations thereof.

In addition to the aspects of the present invention described above and claimed in the appended claims, following are some additional aspects of the present invention. In a first additional aspect, a method of tracking one or more organisms is provided. The method of the first additional aspect includes: receiving, sequentially, a plurality of frames of a video containing a plurality of organisms; displaying, sequentially in real-time on an electronic display, the plurality of frames; receiving one or more user inputs indicating user selection of one or more of the plurality of organisms for tracking; and initiating, as a function of said receiving one or more user inputs, tracking of the one or more of the user selected organisms.

In a second additional aspect, a method according to the first additional aspect, immediately above, is provided in which the receiving of one or more user inputs includes receiving one or more of any one or more of the following: an actuating of a selector (e.g., button, clickwheel, etc.) of a user input device (such as a mouse), a touching of a touchscreen, an outlining of a selection region, a defining of a selection box, etc.

In a third additional aspect, a method of tracking one or more organisms is provided. The method of the third aspect includes: receiving, sequentially, a plurality of frames of a video containing a plurality of organisms; displaying, sequentially in real-time on an electronic display, the plurality of frames; receiving one or more user inputs indicating user selection of one or more of the plurality of organisms for tracking; adjusting, as a function of the one or more of the plurality of organisms selected, one or more parameters of an organism-tracking filter to create an updated organism-tracking filter; and tracking only the ones of the plurality of organisms that fall within the updated organism-tracking filter.

In a fourth additional aspect, a method according to the third additional aspect, immediately above, is provided in which the receiving of one or more user inputs includes receiving one or more inputs resulting from any of any one or more of the following: one or more keystrokes; an actuating of a selector (e.g., button, clickwheel, etc.) of a user input device (such as a mouse); a touching of a touchscreen; an outlining of a selection region; a defining of a selection box, etc.

In a fifth additional aspect, a method of tracking one or more organisms is provided. The method of the fifth aspect includes: receiving, sequentially, a plurality of frames of a video containing the one or more organisms; displaying, sequentially in real-time on an electronic display, the plurality of frames of the video; and calculating, substantially simultaneously with said displaying of the plurality of frames and sequentially from the plurality of frames, tracking information for the one or more organisms; wherein said calculating tracking information includes estimating the shape of each organism being tracked with a geometric model that includes shape elasticity; and displaying, substantially simultaneously with said displaying of the plurality of frames on the electronic display, the tracking information overlaid with corresponding respective ones of the plurality of frames of video.

In a sixth additional aspect, a method according to the fifth additional aspect, immediately above, is provided in which the tracking information includes any one or more calculated organism feature(s) (such as outline, centerline, etc.).

In a seventh additional aspect, a method of tracking one or more worms is provided. The method of the seventh aspect includes: receiving, sequentially, a plurality of frames of a video containing the one or more worms; displaying, sequentially in real-time on an electronic display, the plurality of frames of the video; and calculating, substantially simultaneously with said displaying of the plurality of frames and sequentially from the plurality of frames, tracking information for the one or more worms; wherein said calculating tracking information includes estimating the location and configuration of each worm using a motion model that accounts for peristaltic progression, bending angle, and elasticity; and displaying, substantially simultaneously with said displaying of the plurality of frames on the electronic display, the tracking information overlaid with corresponding respective ones of the plurality of frames of video.

In an eighth additional aspect, a method according to the seventh additional aspect, immediately above, is provided in which the tracking information includes any one or more calculated organism feature(s) (such as outline, centerline, etc.) and track.

In a ninth additional aspect, a method of tracking one or more organisms is provided. The method of the ninth additional aspect includes: receiving, sequentially, a plurality of frames of a video containing the one or more organisms; displaying, sequentially in real-time on an electronic display, the plurality of frames of the video; and calculating, substantially simultaneously with said displaying of the plurality of frames and sequentially from the plurality of frames, tracking information for the one or more organisms; wherein said calculating tracking information includes fitting an organism model to each organism in a frame by calculating a fitting force; and displaying, substantially simultaneously with said displaying of the plurality of frames on the electronic display, the tracking information overlaid with corresponding respective ones of the plurality of frames of video.

In a tenth additional aspect, a method according to the ninth additional aspect, immediately above, is provided in which the calculating tracking information further includes calculating an interaction force between at least two of the organisms and fitting the organism model to one of the at least two organisms as a function of the sum of the fitting force and the interaction force.

In an eleventh additional aspect, a method of tracking one or more organisms is provided. The method of the eleventh aspect includes: receiving, sequentially, a plurality of frames of a video containing a plurality of organisms; displaying, sequentially in real-time on an electronic display, the plurality of frames; and tracking each of the plurality of organisms from one of the plurality of frames to a subsequent one of the plurality of frames as a function of at least one of a positional tolerance and a shape tolerance.

In a twelfth additional aspect, a method according to the eleventh additional aspect, immediately above, is provided in which the tracking includes starting a new organism track if one, the other, or both of the positional and shape tolerances are exceeded.

In a thirteenth additional aspect, a method of tracking one or more organisms is provided. The method of the thirteenth additional aspect includes: receiving, sequentially, a plurality of frames of a video containing a plurality of organisms; displaying, sequentially in real-time on an electronic display, the plurality of frames; and allowing a user to identify whether or not to track any one or more of the plurality of organisms at a frame boundary.

In a fourteenth additional aspect, a method according to the thirteenth additional aspect, immediately above, is provided in which the method further includes allowing the user to identify a number of frames to continue tracking a frame-boundary organism until tracking of the frame-boundary organism is terminated.

In a fifteenth additional aspect, a method of tracking one or more organisms is provided. The method of the fifteenth additional aspect includes: receiving, sequentially, a plurality of frames of a video containing a plurality of organisms; displaying, sequentially in real-time on an electronic display, the plurality of frames; tracking fitness of multiple model-fit hypotheses over a plurality of successive ones of the plurality of frames; and eliminating one or more of the multiple model-fit hypotheses over time as a function of the fitness.

In a sixteenth additional aspect, a method of tracking one or more organisms is provided. The method of the sixteenth additional aspect includes: receiving, sequentially, a plurality of frames of a video containing a plurality of organisms; displaying, sequentially in real-time on an electronic display, the plurality of frames; and allowing a user to fix organism tracking errors.

In a seventeenth additional aspect, a method according to the sixteenth additional aspect, immediately above, is provided in which the allowing of the user to fix organism tracking errors includes allowing the user to do one or more of the following: 1) connect two organism tracks into a single track; 2) swap organism features with one another (such as a head and tail of a worm); 3) split an organism track into two separate organism tracks; 4) delete a detected organism; and 5) manually retrace an organism.

In an eighteenth additional aspect, a method of tracking one or more organisms is provided. The method of the eighteenth additional aspect includes: receiving, sequentially, a plurality of frames of a video containing a plurality of organisms; detecting an organism in one of the plurality of frames; tracking the organism in forward order relative to the video; and tracking the organism in backward order.

In a nineteenth additional aspect, a method according to the eighteenth additional aspect, immediately above, is provided in which the tracking of the organism in forward order includes tracking forward from an initial-organism-detection frame, and said tracking the organism in backward order includes tracking backward from the initial-organism-detection frame.

In a twentieth additional aspect, a method of tracking one or more worms is provided. The method of the twentieth additional aspect includes: receiving, sequentially, a plurality of frames of a video containing a plurality of worms; displaying, sequentially in real-time on an electronic display, the plurality of frames; and fitting a geometric worm model to one of the plurality of worms having a head, a tail, and a length extending therebetween, wherein said fitting includes discriminating the head from the tail as a function of width of the worm along the length of the worm.

In a twenty-first additional aspect, a method according to the twentieth additional aspect, immediately above, is provided in which the discriminating of the head from the tail includes averaging the width over a plurality of frames.

In a twenty-second additional aspect, a method of tracking one or more worms is provided. The method of the twenty-second additional aspect includes: receiving, sequentially, a plurality of frames of a video containing at least one worm; displaying, sequentially in real-time on an electronic display, the plurality of frames; and analyzing at least one frame for the presence of any worms having an omega bend.

In a twenty-third additional aspect, a method according to the twenty-second aspect, immediately above, is provided in which the analyzing for the presence of any worms having an omega bend includes determining whether or not any of the worms has a bending angle less than about 90 degrees over the plurality of frames.

In a twenty-fourth additional aspect, a method of tracking one or more organisms is provided. The method of the twenty-fourth additional aspect includes: fitting a geometric model to each organism in each of a series of frames in a video, wherein said geometric model includes b-spline base coefficients; computing a set of sample points in Cartesian coordinates; and saving the set of sample points in a table.

In a twenty-fifth additional aspect, a method according to the twenty-fourth additional aspect, immediately above, is provided in which each organism is a worm having a centerline and a width profile, the b-spline base coefficients including a set of coefficients for the centerline and a set of coefficients for the width profile.

In a twenty-sixth additional aspect, a method of viewing one or more moving organisms is provided. The method of the twenty-sixth aspect includes: displaying, sequentially at a frame rate, a plurality of frames of a video containing the one or more moving organisms; receiving an indication from a user to zoom and/or pan the video being displayed; and in response to the indication, zooming and/or panning the video being displayed while continuing to display the plurality of frames sequentially at the frame rate.

In a twenty-seventh additional aspect, a method of tracking a multiple ones of a plurality of organisms is provided. In the twenty-seventh aspect, the method includes: receiving a plurality of frames of a video containing the plurality of organisms; setting an image threshold for the plurality of frames; receiving a user-selection of one or more of the plurality of organisms; automatedly adjusting an organism-characterization filter as a function of the user-selected organism(s); following said automatedly adjusting the organism characterization filter, automatedly tracking the multiple ones of the plurality of organisms based on the organism-characterization filter; displaying the plurality of frames of the video; and overlaying, in near-real-time and onto the displayed, tracking data for the multiple ones of the plurality of organisms onto corresponding respective ones of the plurality of frames of the video.

In a twenty-eight additional aspect, one or more machine-readable storage media containing machine-executable instructions for performing any one or more of the methods of the first through twenty-seventh aspects are provided.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:
1. A method of tracking one or more worms, the method being implemented by a computer-based worm-tracking system and comprising:
receiving a plurality of frames of a video containing one or more worms;
displaying, sequentially on an electronic display, the plurality of frames of the video;
calculating, periodically using information in ones of the plurality of frames of the video, tracking information for one or more of the worms so as to create one or more tracked worms, wherein said calculating tracking information includes:

estimating a shape of each tracked worm using a geometric model that includes shape elasticity that accounts for changes in worm length among the ones of the plurality of frames; and estimating the location and configuration of each tracked worm by applying a midpoint radial shift operator that compensates for cumulative radial positioning error at a central location of each tracked worm among the ones of the plurality of frames; and displaying the tracking information overlaid correspondingly onto the ones of the plurality of frames displayed sequentially on the video display.

2. A method according to claim 1, wherein said calculating tracking information includes applying a motion model that accounts for a bending angle of each tracked worm.

3. A method according to claim 1, wherein said calculating tracking information includes fitting a worm model to each tracked worm by calculating a fitting force.

4. A method according to claim 3, wherein said calculating tracking information further includes calculating an interaction force between at least two of the one or more worms and fitting the worm model to one of the at least two worms as a function of a sum of the fitting force and the interaction force, wherein the interaction force accounts for worm self-overlap.

5. A method according to claim 1, wherein said calculating tracking information results in tracking each tracked worm, wherein said tracking includes:

tracking each tracked worm from one of the plurality of frames to a subsequent one of the plurality of frames as a function of a positional tolerance; and starting a new worm track when the positional tolerance is exceeded.

6. A method according to claim 1, wherein said calculating tracking information results in tracking each tracked worm, wherein said tracking includes:

tracking each tracked worm from one of the plurality of frames to a subsequent one of the plurality of frames as a function of a shape tolerance; and starting a new worm track when the shape tolerance is exceeded.

7. A method according to claim 1, further comprising allowing a user to identify whether or not to track any of the one or more worms at a frame boundary.

8. A method according to claim 7, further comprising allowing the user to identify a number of frames to continue tracking a frame-boundary worm until tracking of the frame-boundary worm is terminated.

9. A method according to claim 1, further comprising:
tracking fitness of multiple model-fit hypotheses over multiple successive ones of the plurality of frames; and
eliminating one or more of the multiple model-fit hypotheses over time as a function of the fitness.

10. A method according to claim 1, further comprising:
allowing a user to identify a worm-tracking error; and
automatedly fixing the worm tracking error as a function of the user identifying the worm-tracking error.

11. A method according to claim 10, wherein said allowing a user to identify a worm-tracking error includes allowing the user to connect two worm tracks together into a single worm track.

12. A method according to claim 10, wherein said allowing a user to identify a worm-tracking error includes allowing the user to swap head and tail positions of each tracked worm.

13. A method according to claim 10, wherein said allowing a user to identify a worm-tracking error includes allowing the user to split a worm track into two separate worm tracks.

14. A method according to claim 10, wherein said allowing a user to identify a worm-tracking error includes allowing the user to delete each tracked worm.

15. A method according to claim 10, wherein said allowing a user to identify a worm-tracking error includes allowing the user to manually trace a worm.

16. A method according to claim 1, wherein said calculating tracking information includes:

tracking at least one worm of the one or more tracked worms in forward order relative to the video; and tracking the at least one worm in backward order relative to the video.

17. A method according to claim 16, wherein said tracking at least one worm in forward order includes tracking forward from an initial-worm-detection frame, and said tracking the at least one worm in backward order includes tracking backward from the initial-worm-detection frame.

18. A method according to claim 1, further comprising analyzing at least one frame for the presence of any worms having an omega bend.

19. A method according to claim 18, wherein said analyzing for the presence of any worms having an omega bend includes determining whether or not any of the worms has an acute bending angle over a plurality of frames.

20. A method according to claim 1, further comprising:
setting an image threshold for the plurality of frames;
receiving a user selection of one or more of the worms; and
automatedly adjusting a worm-characterization filter as a function of the one or more user-selected worms so as to generate a set of worm-characterization parameters;
wherein said calculating tracking information includes calculating tracking information as a function of the set of worm-characterization parameters.

21. A method according to claim 1, further comprising, prior to said calculating:
performing image thresholding on image data of the video to obtain thresholded-image data; and
applying one or more morphological filters to the thresholded image data to obtained segmented image data;
wherein the tracking information is derived from the segmented image data.

22. A method according to claim 1, wherein each of said calculating tracking information and said displaying the tracking information occur substantially simultaneously with said displaying the plurality of frames.

23. A method according to claim 22, wherein said displaying the plurality of frames of the video includes displaying the plurality of frames at a normal frame-rate that allows a viewer to perceive, in realtime, realtime motion of each tracked worm.

* * * * *